(12) United States Patent
Rodriguez De Castro et al.

(10) Patent No.: US 11,296,866 B2
(45) Date of Patent: Apr. 5, 2022

(54) DYNAMIC TRANSFORM IN BLOCKCHAIN HEADER VALIDATION

(71) Applicant: Blockchain ASICS, Inc, Sunnyvale, CA (US)

(72) Inventors: Edward L. Rodriguez De Castro, San Francisco, CA (US); Sagar V. Reddy, Sunnyvale, CA (US)

(73) Assignee: Blockchain ASICs Inc., Sunnyvale, CA (US)

( * ) Notice: Subject to any disclaimer, the term of this patent is extended or adjusted under 35 U.S.C. 154(b) by 267 days.

(21) Appl. No.: 16/733,690

(22) Filed: Jan. 3, 2020

(65) Prior Publication Data

US 2020/0228319 A1    Jul. 16, 2020

Related U.S. Application Data

(60) Provisional application No. 62/792,763, filed on Jan. 15, 2019.

(51) Int. Cl.
*H04L 9/06* (2006.01)
*G06F 9/30* (2018.01)

(52) U.S. Cl.
CPC ........ *H04L 9/0637* (2013.01); *G06F 9/30134* (2013.01); *H04L 9/0643* (2013.01); *H04L 2209/38* (2013.01)

(58) Field of Classification Search
CPC . H04L 9/0643; H04L 9/3239; G06Q 20/0658; G06Q 20/3827; G06Q 2250/30;
(Continued)

(56) References Cited

U.S. PATENT DOCUMENTS

| 10,601,711 | B1 * | 3/2020 | Matthews | .............. | H04L 69/324 |
| 2015/0023495 | A1 * | 1/2015 | Zhang | ................... | H04L 9/0643 |
| | | | | | 380/28 |

(Continued)

FOREIGN PATENT DOCUMENTS

| WO | 2015077378 | 5/2015 |
| WO | 2016046820 | 3/2016 |

(Continued)

OTHER PUBLICATIONS

"International Application Serial No. PCT US2020 012154, International Search Report dated Mar. 25, 2020", 2 pgs.

(Continued)

*Primary Examiner* — Olugbenga O Idowu
(74) *Attorney, Agent, or Firm* — Schwegman Lundberg & Woessner, P.A

(57) ABSTRACT

Integrated circuits, methods, and computer programs are directed to performing proof-of-work (POW) operations. One integrated circuit includes a nonce register for storing a nonce value, a first one-way function (OWF) circuit configured to generate a hash of a header, a dynamic transform circuit configured to transform the hash of the header to generate a transform value, and a second OWF circuit configured to generate a hash of the transform value to obtain a validation parameter. The header includes the nonce value for POW validation of the header. Further, the transformation by the dynamic transform circuit is based on the nonce value. The validation parameter determines whether the POW meets a predetermined target for validation of the header with the nonce value.

20 Claims, 16 Drawing Sheets

(58) Field of Classification Search
CPC ..... G06Q 30/018; H04W 12/02; G06F 21/00; G06F 21/645
See application file for complete search history.

(56) References Cited

U.S. PATENT DOCUMENTS

| | | | |
|---|---|---|---|
| 2015/0332283 A1* | 11/2015 | Witchey | H04W 12/02 |
| | | | 705/3 |
| 2017/0187535 A1* | 6/2017 | Middleton | H04L 9/3247 |
| 2019/0236298 A1* | 8/2019 | Agarwal | H04L 9/3239 |
| 2020/0044854 A1* | 2/2020 | Hsueh | H04L 9/3236 |
| 2021/0099311 A1* | 4/2021 | Saponaro | H04L 9/3247 |
| 2021/0182807 A1* | 6/2021 | Akuon | G06Q 20/0658 |

FOREIGN PATENT DOCUMENTS

| | | |
|---|---|---|
| WO | 2018004950 | 1/2018 |
| WO | 2020150011 | 7/2020 |

OTHER PUBLICATIONS

"International Application Serial No. PCT US2020 012154, Written Opinion dated Mar. 25, 2020", 5 pgs.

Jesus, "A Survey of How to Use Blockchain to Secure Internet of Things and the Stalker Attack", Security and Communication Networks, vol. 2018, Article ID 9675050,, [Retrieved on Feb. 24, 2020], Retrieved from the Internet URL:https: www.hindawi.com journals scn 2018 9675050 , (Apr. 4, 2018), 1-28.

"International Application Serial No. PCT US2020 012154, International Preliminary Report on Patentability dated Jul. 29, 2021", 7 pgs.

* cited by examiner

DYNAMIC TRANSFORM IN BLOCKCHAIN HEADER VALIDATION

CLAIM OF PRIORITY

This application claims the benefit of priority from U.S. Provisional Patent Application No. 62/792,763, filed Jan. 15, 2019, and entitled "Dynamic Transform in Blockchain Header Validation." This provisional application is herein incorporated by reference in its entirety.

TECHNICAL FIELD

The subject matter disclosed herein generally relates to the design of Integrated Circuits (ICs), and more particularly, some embodiments relate to the design of ICs for secure communications.

BACKGROUND

Application-specific integrated circuits (ASICs) are integrated circuits designed and built to serve a particular purpose or application. ASICs provide fast computational speed compared with slower, more generalized solutions, such as software solutions running on general-purpose processors or field programmable gate arrays (FPGAs). As the name implies, ASICs are generally designed to perform only one specific application, resulting in a trade-off between flexibility and computational speed. ASICs are increasing in importance in cryptography-related fields, such as proof-of-work systems, digital rights management systems, and other applications generally having stringent speed and efficiency requirements.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
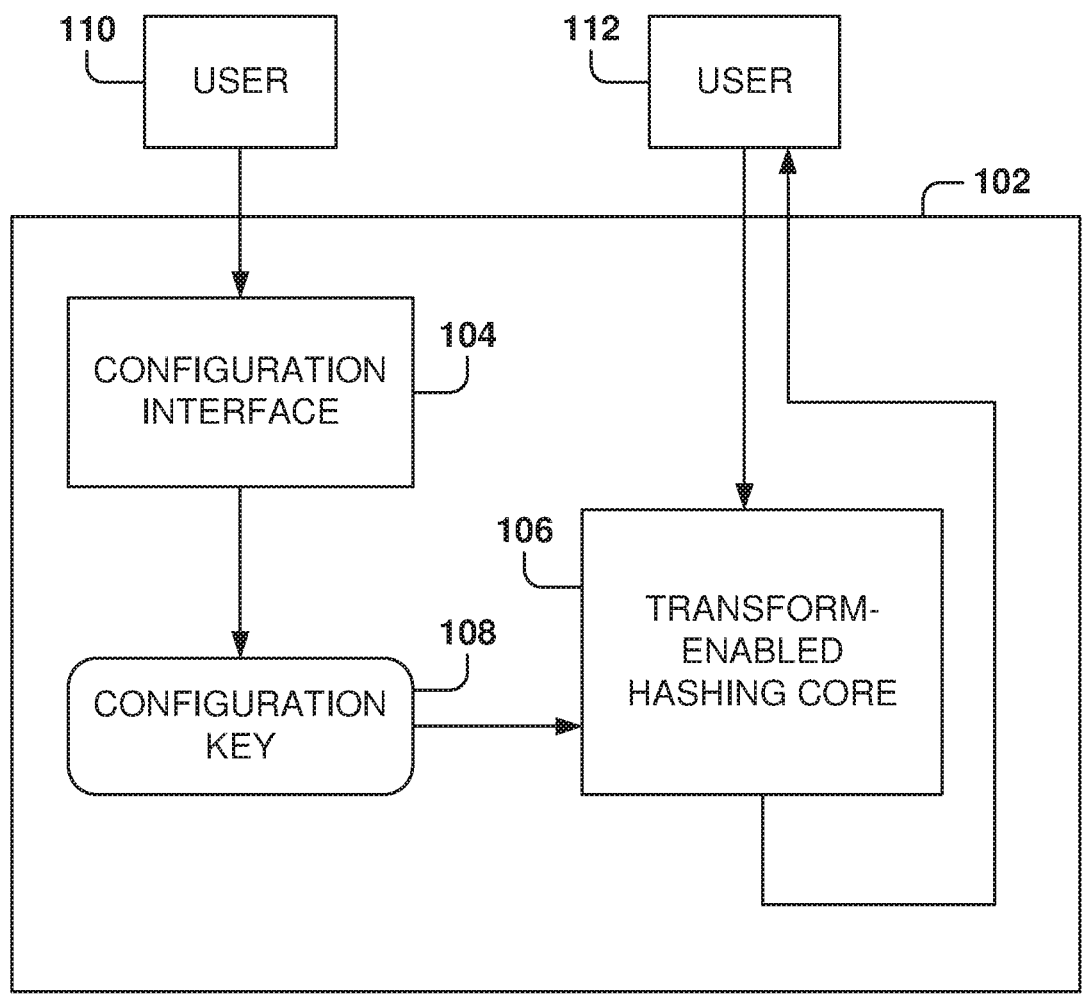
FIG. 1 shows the operation of an integrated circuit for transform-enabled cryptographic operations, according to some example embodiments.

Example circuits, methods, and computer programs are directed to performing proof-of-work (POW) validations using mathematical operations that change for each POW cycle. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some example embodiments, an integrated circuit (IC) includes circuitry for dynamically modifying the mathematical POW operations the IC applies to a given input, where the modification is based on said input and hardware-implemented calculations performed during previous POW validations. The resulting outputs appear to be random but are programmatically replicable, allowing for the external verification of the POW operations by other ICs or by software programs executing on other devices.

In some example embodiments, an ASIC circuit, for performing proof-of-work (POW) of blockchain headers, includes a dynamic transform function circuit between two one-way function (OWF) circuits. The dynamic transform circuit performs an operation on the output of a first OWF to alter one or more bits, and the result are used as an input to a second OWF. The output of the second OWF is used for checking if the output meets a certain accuracy criterion. The dynamic transform function circuit is named "dynamic" because the function changes at every cycle during POW operations, where each cycle includes a different value for the nonce in the header being checked. The dynamic transform function circuit may be initialized with a value and then changed every cycle based on one or more parameters, such as the value of the nonce register.

One integrated circuit includes a nonce register for storing a nonce value, a first OWF circuit configured to generate a hash of a header, a dynamic transform circuit configured to transform the hash of the header to generate a transform value, and a second OWF circuit configured to generate a hash of the transform value to obtain a validation parameter. The header includes the nonce value for proof-of-work (POW) validation of the header. Further, the transformation by the dynamic transform circuit is based on the nonce value. The validation parameter determines if the POW meets a predetermined target for validation of the header with the nonce value.

In one embodiment, a method includes operations for receiving a header, initializing a nonce register with a nonce value, and performing a first OWF to generate a hash of the header. The header, that includes the nonce value, is checked for proof-of-work (POW) validation. Further, the method includes an operation for performing a dynamic transform to transform the hash of the header resulting in a transform value. The transformation by the dynamic transform is based on the nonce value. Additionally, the method includes operations for performing a second OWF to generate a hash of the transform value resulting in a validation parameter and for determining, based on the validation parameter, if the POW meets a predetermined target for validation of the header with the nonce value.

FIG. 1 shows the operation of an integrated circuit (IC) 102 for transform-enabled cryptographic operations, according to some example embodiments. The IC 102 contains a transform-enabled hashing core 106, implemented as a stand-alone integrated circuit, that performs transform-enabled hashing operations.

The IC 102 also contains a programming and configuration interface 104 and a configuration key 108. The configuration key 108 is composed of a string of binary digits and is also referred to herein as a transform key or a transformation key.

Two exemplary users 110 and 112 can access the IC 102, with a first user 110 accessing the programming and configuration interface 104, and a second user 112 accessing the transform-enabled hashing core 106. The second user 112 may use a hashing core user interface (not shown). In various embodiments, some or all of the functions of the configuration and programming interface 104 and the hashing core user interface may be combined into a single configuration, programming, and hashing core user interface, while in other embodiments, such functions may be divided among more than two interfaces.

The general mode of operation is that the first user 110 uses the programming and configuration interface 104 to both configure various parameters of the operation of the IC 102 and to program one or more configuration keys 108 into the programmable transformation function or functions in the transform-enabled hashing core 106, where they may be implemented as datapath circuitry. Note that configuration keys 108 are not conventional cryptographic keys in the strictest sense, but instead are customized descriptions of how a selected transformation function is to be activated, such as to transform original input data into transformed input data.

The second user 112 enters an input value, a transaction, or a message that is directly communicated to the core 106 that will calculate and output the corresponding hash value. For a given input value and configuration key 104, any user of an instance of transform-enabled IC 102 is able to calculate the same corresponding hash value. The input value may comprise a transaction block header from a blockchain, for example, but other types of inputs may be used. It is noted that processing the input to produce a corresponding hash value may be carried out by the second user without requiring knowledge of the configuration key, or configuration keys, programmed into the core 106.

The core 106 includes one or more blocks of circuitry implementing a cryptographic function (generally a cryptographic OWF that is hard to reverse, such as a secure hashing algorithm). Due to interaction of the transformation with the mathematical properties of the cryptographic algorithms involved, particularly their nature as OWFs that are hard to revert, the combined effect is to produce a systemic transformation of the bits contained in the final value calculated by the circuit that is not easily deciphered, not easily distinguishable from noise, and not easily replicable by a party lacking full prior knowledge of the user's key or keys, but yet is fully consistent and easily replicable and thus verifiable by a party with prior knowledge of the keys or access to the means to utilize them in calculation even while lacking knowledge of them (such as a party in possession of an ASIC programmed to embody the keys within its datapath circuitry). As used herein, terms such as "hard" and "easy" may be understood in the sense of computational complexity theory, particularly polynomial time theory. For example, "hard to revert" may refer to the impossibility of reversing a hash function, unless a huge amount of computational resources were used for a very long time (e.g., weeks, months, or years). On the other hand, the calculation of a hash function is considered "easy" as the core 106 may take milliseconds to perform the hash.

Due to the interaction thus established between the programmatic transformation and certain mathematical properties of the cryptographic algorithms involved (particularly, as noted earlier, their nature as OWFs that are easy to perform but hard to revert), the combined effect is to produce a systemic transformation of the bits contained in the final value calculated by the circuit. The transformation is not easily deciphered, not easily distinguishable from noise, and not easily replicable by a party lacking full prior knowledge of the key or keys programmed into the transformation function. Yet the transformation is fully consistent and easily replicable, and thus verifiable, by a party with prior knowledge of the keys or access to the means to utilize them in calculation even while lacking knowledge of them (e.g., a party in possession of a previously-programmed ASIC that embodies said keys within its datapath circuitry).

In some embodiments, each user is a person, while in other embodiments, each user is an automated process such as wallet software, mining software, or other kinds of automated processes. In certain embodiments, there is a single interface for the configuration of the various operating aspects of the IC 102 as a whole, with the programming of keys and the obtaining of final transform-enabled hash values calculated on the basis of data supplied by a user. In other embodiments, some or all of those functions are separate.

In some embodiments, various implementations of the IC 102 are physically integrated into the same semiconductor material, such as silicon, as other embodiments of the technology described herein. In some such embodiments, the IC 102 may additionally be further connected to other embodiments of the technology described herein. For example, in various cases, the IC 102 have a shared access to programmable transformation functions or functions in the transform-enabled hashing core 106 as other circuits within the same IC 102. In various other embodiments, the transform-enabled IC 102 may be physically integrated into the same semiconductor material as another integrated circuit carrying out a different task, such as a microprocessor, a network processor, a system-on-a-chip, and others. In certain embodiments, the core 106 embodies the configuration key 108 as circuitry by means of one-time programmable circuit elements such as micro-fuses, while in certain embodiments, other re-writeable circuit elements may be used, such as binary registers, flip flop circuits, latches, gates, random access memory (RAM), non-volatile RAM, and the like.

Figure 2:
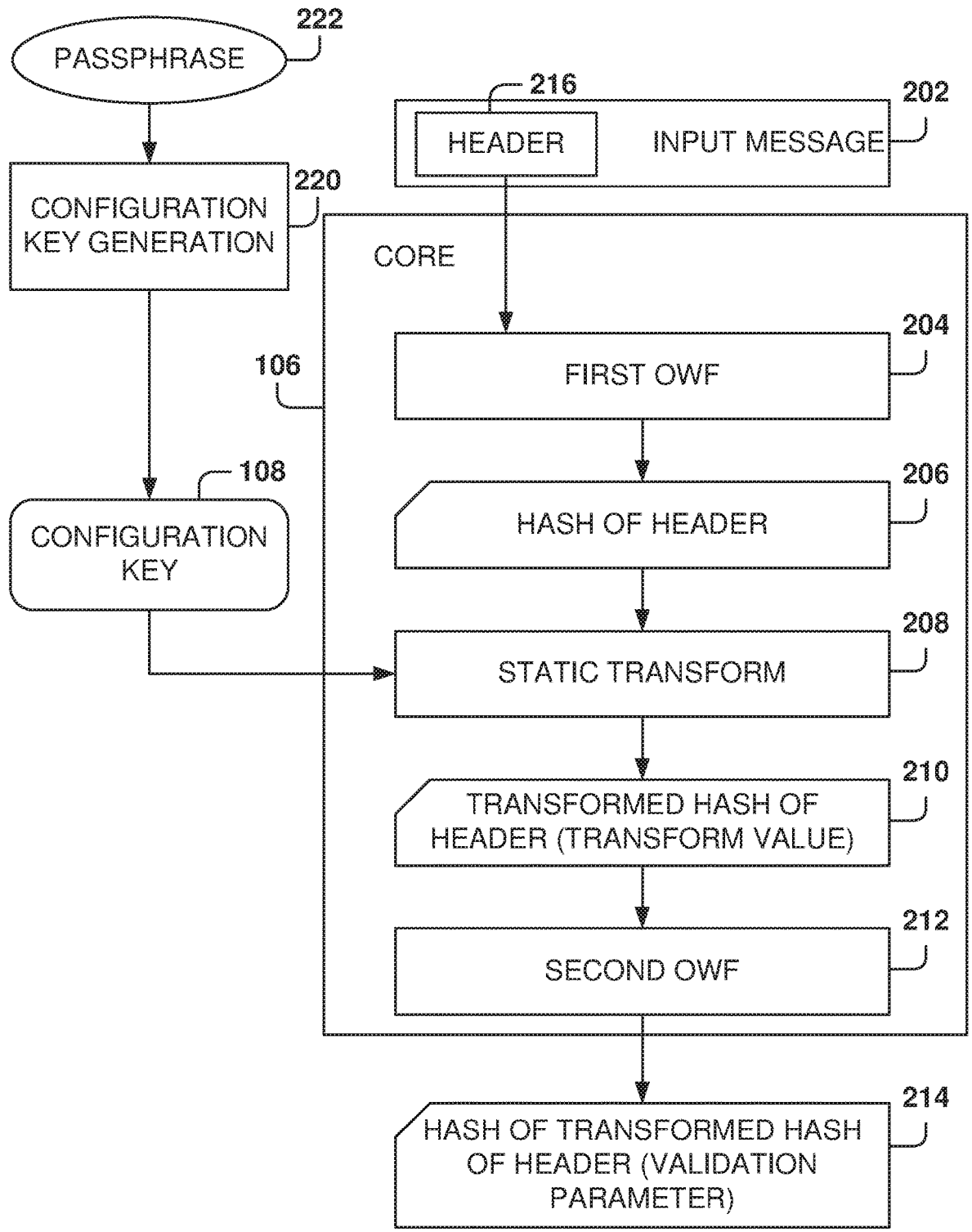
FIG. 2 shows a block diagram of the transform-enabled hashing core, according to an embodiment.

FIG. 2 shows a block diagram of the transform-enabled hashing core 106, according to an embodiment. This diagram depicts the operations performed for the second user 112 to obtain final transform-enabled hash values.

A user provides a passphrase 222 that controls aspects of the information stream management methodology. This user may comprise the first user 110 of FIG. 1, for example, who provides, in one embodiment, the user passphrase 222 via the programming and configuration interface 104. The passphrase 222 may be provided during the manufacture of IC 102, or thereafter. The passphrase 222 comprises a string of binary numbers or a string of text that may be more easily remembered by a human user but still readily convertible into a string of binary numbers.

The secrecy of the passphrase 222 may prevent any other parties from enabling the creation of the information stream being managed. The passphrase 222 may also enable control of all other operations performed in the information hierarchy (e.g., processing of the information stream, performing POW operations, and identifying the information stream).

A configuration key generation processing 220 calculates the configuration key 108 based on the passphrase 222. The IC 102 receives the passphrase 222 and performs on-the chip configuration key generation processing 220 to produce the configuration key 108 at the IC 102. In other embodiments, the configuration key is received as input at the IC 102. The on-chip configuration key generation 220 processing, rather than a separate off-chip implementation, may enhance security, as will be described.

The configuration key generation processing 220 comprises at least one application of an OWF to the passphrase 222. In one embodiment, the configuration key generation processing 220 comprises two sequential applications of an OWF to the passphrase 222. The configuration key generation processing 220 may, for example, comprise two sequential applications of SHA256 to the passphrase 222, although this disclosure is not limited in that regard.

Use of an OWF renders derivation of the passphrase 222 from the configuration key 108 computationally infeasible. That is, the passphrase 222 is upstream of the OWF and is therefore cryptographically secure. Knowledge of the passphrase 222 and of the calculation process enables the easy calculation of the configuration key 108. However, knowledge of the configuration key 108 and of the process by which it is calculated, on the basis of the passphrase 222, does not enable easy calculation of the passphrase 222. Thus, in such embodiments, knowledge of the passphrase 222 implies knowledge of the configuration key 108, but knowledge of the configuration key 108 does not imply knowledge of the passphrase 222. Knowledge of the passphrase 222 is required to generate the configuration key 108 used to configure the static transform 208 and thus the IC 102 to perform in the specific manner that is described by passphrase 222.

Therefore, in one embodiment, the passphrase 222 enables creation of a blockchain, while the configuration key 108 enables others, who do not know the passphrase 222, to nevertheless process and verify headers 216 such as blockchain headers. Further, knowledge of the configuration key 108 enables the creation of any number of transform-enabled cryptographic ICs 102 for processing headers 216, if the formulation of the static transform 208 is known.

An input message 202 includes a header 216, and the header may be provided to the core 106 and passed through a first OWF 204 implementation hashing block. The header 216 may, for example, be a candidate block header, such as from a blockchain.

In general, the first OWF 204 (e.g., hashing block) may be configured as a set of circuitry that executes the mathematical operations defined by the applicable hashing algorithm. One widely used hashing algorithm is the SHA, the second version of which is now used as a standard hashing algorithm, often for input messages of 256 bits in length (referred to herein as SHA-256 or simply SHA unless otherwise indicated). However, this disclosure is not limited in that regard, as any OWF may be used. Although some embodiments are presented with reference to 256-bit values, the same principles may be utilized for values with different sizes (e.g., 512 bits).

The output of the first OWF 204 is a hash 206 of the header 216. A hash, sometimes known as a message digest, may be used as a type of cryptographic description of original message content.

The hash 206 is then be processed by a customizable programmable transformation function, referred to herein as static transform 208, which may also be implemented in circuitry as a transform block. The static transform 208 is referred to as "static" because, once programmed, the circuitry within the transform block effects a specific programmatic transformation upon the data provided, reflecting the configuration key 108 configured for the transform block. Thus, the transformation the circuitry applies will directly and consistently affect the final value calculated by circuitry further along the datapath.

As discussed in more detail below, a dynamic transform refers to a transform function that may be changed by the core 106 based on different parameters. The dynamic transform may be described by a binary value that includes a plurality of bits. The dynamic transform performs a logical operation on an input value to generate an output value (e.g., performing an XOR, bit by bit, of the input value with the bits that define the dynamic transform). The dynamic transform is referred to as "dynamic" because its value changes for the validation of each header. In other embodiments, the dynamic transfer may be reused and changed every few headers.

The static transform 208 is based on a passphrase entered by the user, but the dynamic transform does not depend on the passphrase, although sometimes, the dynamic transform may be adjusted based on the configuration key. In some cases, the dynamic transform is changed based on the configuration key and additional parameters, and in other cases the dynamic transform is changed without being dependent on the configuration key.

The static transform 208 generates a transformed hash 210, referred to as the transform value, of the header 216. The static transform 208 may be a simple transformation of the hash of the header 216, such as an inversion of one or more bits, in some embodiments, the transposition or swapping of bits in other embodiments, or a combination thereof. The programming of the static transform may customize the treatment to which data fed into the transformation function is subjected. The configuration key 108 controls the specific programming of the static transform 208. For example, the configuration key 108 is simply a string of binary digits denoting which corresponding bits of input data are to be inverted, transposed, or both, by the static transform 208, according to various embodiments. That is, in one embodiment, each particular bit of the configuration key 108 determines whether each corresponding particular bit of input data is passed through directly without transformation or passed after being inverted. In some embodiments, the transformation of an input bit depends on one or more bits in the static transform and/or other input bits.

The transformed hash 210 of the original header 216 is then processed by a second OWF 212 (e.g., a second hashing block). In some embodiments, the second OWF 212 implements the same cryptographic operation as the first OWF 204. In other embodiments, the second OWF 212 implements a different cryptographic operation than the first OWF 204. The output value 214 of the core 106 is thus a hash of a transformed hash 210 of the original header 216.

The secure programming of the transform-enabled IC 102 enables a variety of advantages. For example, a novel information hierarchy may be defined and cryptographically secured via the IC 102 that stores configuration data without providing external visibility or accessibility to that data. The information hierarchy enables a cryptographic management methodology that enables the creation of, provides for useful processing of, and allows the simple identification of an information stream to be processed. The information stream may comprise a blockchain, for example.

The formulation of the static transform 208 may be published or it may be kept obscured. The cryptographic strength of the embodiments does not rely on the secrecy of the static transform 208. The configuration key 108 that controls the customization of the static transform 208 may also either be kept secret or made public. However, this choice depends on whether the second users 112 are intended to be able to process the information stream with only original programmed circuitry or also with replicated or "cloned" circuitry. For example, in some cases, only members of a given group, such as a government, corporation, or other set of the second users 112, are intended to have the capability to process a private information stream, so the configuration key 108 is a secret shared only with such intended parties. In other cases, the intent is for anyone to be able to process a public information stream without the requirement for a shared secret, so the configuration key 108 is made public.

The specific predetermined output value 214 is a unique identifier of a given information stream from which header 216 originated. A second user 112 who possesses neither knowledge of the passphrase 222 nor of the configuration key 108 may therefore nonetheless identify a given information stream using an instance of the programmed IC 102. Such a second user 112 may process messages but cannot make copies of the IC 102 that has been programmed to inaccessibly and invisibly contain the configuration key 108. This ability to identify an information stream with no direct knowledge of the passphrase 222 nor of the configuration key 108 may be particularly advantageous in certain use scenarios.

For example, in one embodiment, the information stream is a blockchain, and the predetermined output value 214 is a ChainID that uniquely identifies the blockchain. In the future, there may be a large number of different blockchains, so using a ChainID allows any second user 112 with a programmed transform-enabled cryptographic IC 102 to distinguish the blockchain from which headers 216 originate from all others.

The ChainID is thus the lowest derivation level of the information hierarchy. The ChainID does not enable the creation of a blockchain (that requires knowledge of the passphrase 222) and does not by itself enable the ability to replicate the IC 102 (that requires knowledge of the configuration key 108 by the second user 112 which may not be accessible or visible from the IC 102). The ChainID functionality does, however, enable the easy identification of the blockchain. Thus, the information hierarchy can separate out the ability to create a blockchain, interact with it, and identify it. Someone who knows only the configuration key 108 but not the passphrase 222 cannot create a blockchain, for example, but can identify and verify it. Such verification is the basis of a proof-of-work system (e.g., bitcoin mining), although this disclosure is not limited in that regard.

POW verification systems are predicated on solving complex computational problems, not for any intrinsic value of the answer arrived at, but for the probative value such an answer provides that a significant amount of computational work has been expended in producing such a result. POW verification systems have applications across a broad range of modern computational systems, including, without limitation: systems used for the deterrence of denial-of-service (DoS) network attacks; systems used for the prevention of unwanted commercial email (spam); and systems used for other applications. Another use of POW verification is for the cryptographic network POW verification process underlying blockchain technology, which enables decentralized trustless transaction systems, such as those supporting cryptographic currencies, the most widely known of which is bitcoin.

Certain embodiments of the technology disclosed herein allow a user to enable third parties to easily verify the proof-of-work produced by transform-enabled integrated circuits by providing the third parties with knowledge of the configuration key and thus enabling them to verify such proof of work by means of, for example and without limitation, software running on general-purpose microprocessors, FPGAs programmed for this purpose, or other means. But knowledge of the configuration key does not enable the third parties to program additional copies of the integrated circuit to calculate transform-modified proof-of-work in the same manner as they are calculated by instances of the integrated circuit that have been programmed using the user passphrase. The circuit described has been designed to perform such validations while not revealing information about the precise mathematical operations involved in the production of the transformed hash values verified.

Further, the system described is also applicable to fields other than the field of blockchain technology. In such other fields, the system may be used for the creation of other secure hardware-based products.

Figure 3:
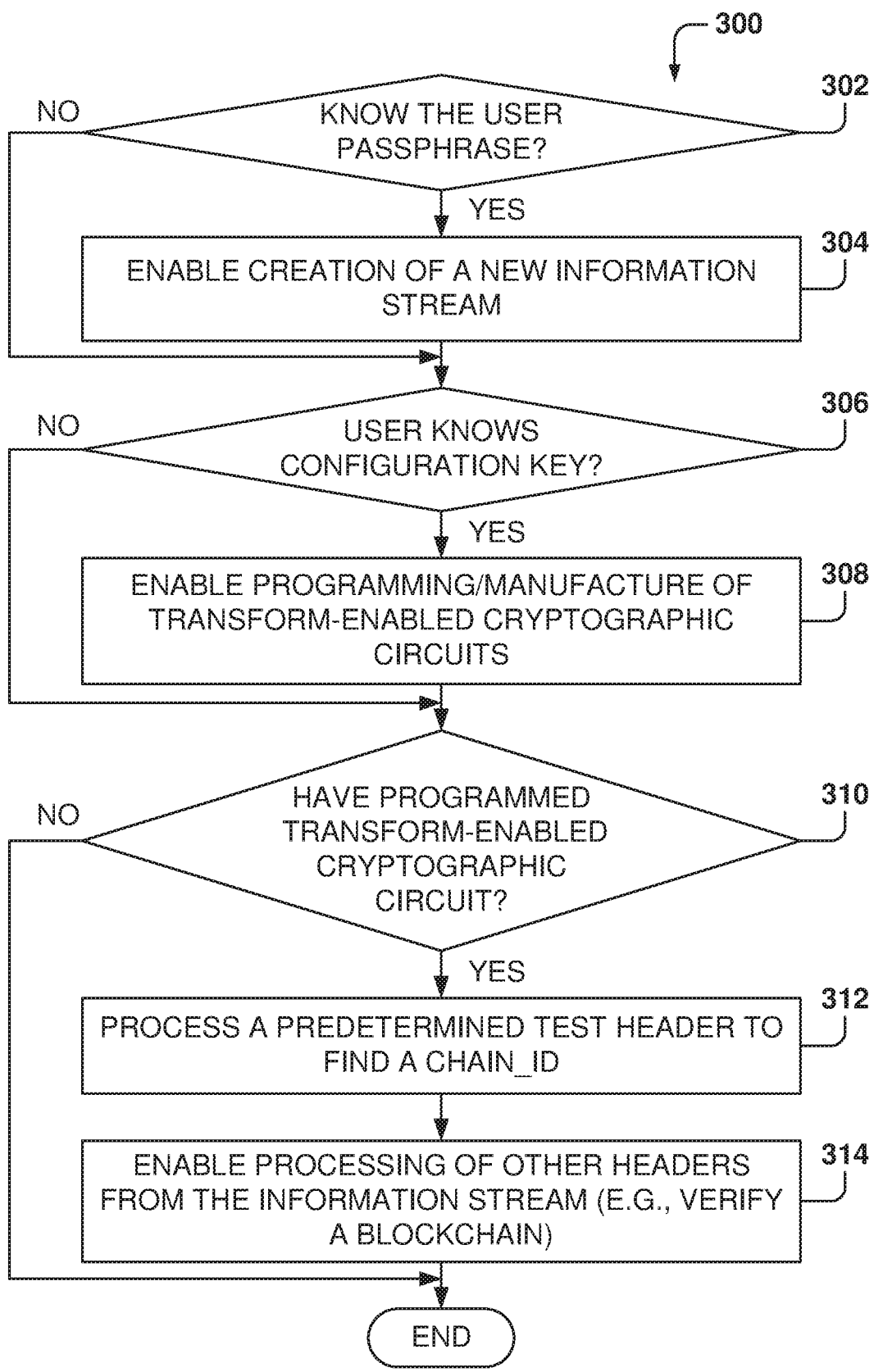
FIG. 3 shows a flowchart of the management methodology for the information hierarchy, according to an embodiment.

FIG. 3 shows a flowchart 300 of the management methodology of the information hierarchy, according to an embodiment. At 302, the method 300 initially determines if a user knows the passphrase 222. If so, at 304, the user is granted full control over the information hierarchy. Such a user is provided with the ability to create a new unique information stream, such as a blockchain, for example. The user proceeds to create an information stream by customizing the programming of a transformation function and using the IC 102 to create blockchain block headers, for example. The headers may include a field indicating the particular validation method to be used for corresponding message content.

If the user does not know the passphrase 222, the method 300 proceeds to 306. At 306, the methodology determines if the user knows the configuration key 108. If so, the user, at 308, is granted the further privilege of programming additional instances or copies of transform-enabled cryptographic ICs 102. The programming may occur during a manufacturing process or thereafter.

If the user does not know the configuration key 108, the method 300 proceeds to 310. At 310, the method 300 determines if the user at least has a programmed transform-enabled cryptographic IC 102 to process an information stream that has been created in view of the technology described in this disclosure. If so, then at 312, the method 300 processes a predetermined test header 216 to produce a predetermined output value 214 that serves as a ChainID The ChainID may indicate a particular information stream, such as a blockchain, from which input messages originate. If user does not have a programmed transform-enabled cryptographic IC 102, the method ends. This operation 312 is optional in some embodiments.

At 314, the method 300 enables the processing of other headers from the information stream. In one embodiment, the information stream is a blockchain, and the processing comprises verification of the blockchain through computation of transform-customized hashes for subsequent comparison. If the user does not have a programmed transform-enabled cryptographic IC 102, then an information stream that has been created in view of the technology described in this disclosure cannot be processed nor identified by the user.

In example embodiments, particular circuitry may advantageously secure the programming of the transform-enabled cryptographic IC 102. Such particular circuitry enables the first user 110 to provide a copy of the passphrase 222 to the transform-enabled cryptographic IC 102, which is used to generate the unique configuration key 108 for the cryptographic IC 102. Similarly, the circuitry enables the derivation of the configuration key 108 from the passphrase 222.

The configuration key 108 in the circuitry is stored in isolation (e.g., in a manner that is neither accessible nor visible outside of IC 102) and serves to enable enforcement of part of the information hierarchy. That is, if the user 110 has knowledge of the configuration key 108 during or after its generation, the user 110 may replicate circuitry (or executable instructions) that implements the particular customized transform-enabled hashing used to process headers 216. In contrast, if the user 112 does not have knowledge of the configuration key 108 but simply has access to circuitry that invisibly stores the configuration key 108 in isolation, such user 112 may process headers but may not replicate the circuitry. That is, the invisible, inaccessible, and indelible isolated storage of the configuration key 108 prevents the circuitry from being "cloned." The processing of headers 216 may include identifying a given information stream and verifying messages from the information stream, for example, as previously described, whether by circuitry or executable instructions.

Hardware based enforcement of the management of the information hierarchy may not only enable different users to be granted different levels of control of the information hierarchy 300, it may also limit the availability of the configuration key 108. For example, if the first user 110 who has the passphrase 222 wants to generate a configuration key 108, that does not necessarily mean that the first user 110 wants to have actual knowledge of the configuration key 108, or even knowledge of how the configuration key 108 is derived from the passphrase 222. The first user 110 may not want to be capable of determining the configuration key 108 at all.

Instead, the first user 110 may simply wish to create hardware that only generates and securely stores the configuration key 108 internally, that is, in isolation, to enable input message processing and information stream identification by, for example, second users 112. The particular methodology for generating the configuration key 108 from the passphrase 222 thus may not need to be known even to the first user 110 who has control of the entire information hierarchy.

Similarly, particular circuitry better protect the passphrase 222 that enables complete control of the entire information hierarchy. That is, the first user 110 may provide the passphrase 222 to the transform-enabled cryptographic IC 102, but that IC 102 may delete the received passphrase 222 after the configuration key 108 has been determined and the key value or values are indelibly and inaccessibly stored within the IC 102.

The technologies for one-time programmable memory include, but are not limited to, micro-fuses, anti-fuses, non-volatile RAMS including, but not limited to, flash memory or other types of non-volatile memory. In general, determination of the state of each element of such memories via external physical examination is intentionally very difficult or infeasible.

Software-based implementations of the transform-customized message hashing process previously described are also within the scope of this disclosure. However, hardware-based implementations may be more immune to monitoring during operation. The undesirable consequences of such monitoring could include, for example, the eventual discovery of the passphrase 222, the configuration key 108, and the configuration key generation 220 methodology.

Hardware implementations may therefore offer better enforcement of the restricted creation of information streams, such as blockchains, based on the secrecy of the passphrase 222. Hardware implementations may also offer better enforcement of the restricted ability to replicate transform-customized hashing circuitry, based on the availability of the configuration key 108.

Figure 4:
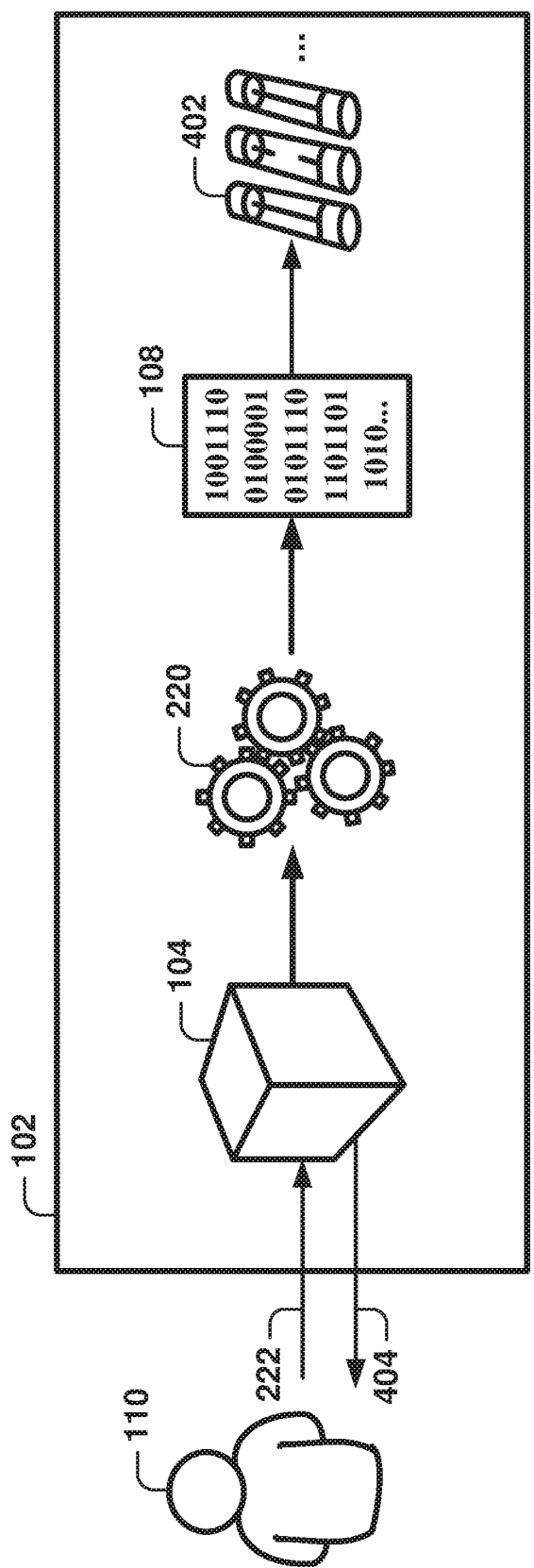
FIG. 4 shows a functional diagram of an internally-programmable integrated circuit, according to an embodiment.

FIG. 4 shows a functional diagram of an internally-programmable integrated circuit, according to an embodiment. The IC 102 acts as a conceptual "shopkeeper" that receives instructions from a customer (e.g., the first user 110) at the front counter of a shop, and then performs various tasks the customer requires, but does so "behind the scenes" or out of view of the customer, in isolation.

In this case, the IC 102 receives a copy of the passphrase 222 from the first user 110 via the programming and configuration interface 104 as previously described. The programming and configuration interface 104 acts as a "black box" that accepts certain inputs, but only outputs acknowledgements and does not echo the inputs provided. That is, the programming and configuration interface 104 does not allow access to or visibility of the isolated internal operations of the IC 102.

The IC 102 then generate the configuration key 108 according to a configuration key generation 220 methodology embedded in its circuitry. The first user 110 may or may not be aware of the configuration key generation 220 methodology, in some embodiments.

The IC 102 then stores the generated configuration key 108 in an indelible and hidden manner and delete its copy of the passphrase 222. In one embodiment, the configuration key 108 is stored in a one-time programmable memory 402, which may comprise an array of micro-fuses, anti-fuses, or various types of non-volatile memory. Micro-fuses are generally short circuits until they are effectively "blown" open (e.g., rendered non-conductive), typically by application of a voltage pulse of particular magnitude and duration. Anti-fuses, in contrast, are generally open circuits until they are effectively "burned" closed (e.g., rendered conductive), typically again by application of a voltage pulse of particular magnitude and duration. These state changes may not result in physical changes that are readily visible.

The IC 102 provides an acknowledgement 404 to the first user 110 to, for example, denote at least one of the receipt of the passphrase 222, the deletion of the passphrase 222, or the successful completion of the storage of the configuration key 108 into memory 402. Thus, the conceptual shopkeeper effectively provides the internally-programmed IC 102 to the customer (e.g., the first user 110) after having customized it in isolation (e.g., without any customer access or visibility into the programming process).

The approach provided offers the first user 110 the advantage of trusting the hardware implementation with the passphrase 222 for only a limited time, because the hardware implementation will not store the passphrase 222 once the configuration key 108 has been generated and stored internally. Further, the first user 110 knows that the hardware implementation is relatively secure from attack. That is, a hacker may be able to dismantle the integrated circuit 102 to attempt to determine the configuration key generation methodology and the programmable transformation function, but the security of the system does not depend on knowledge of either.

Recovery of the actual configuration key 108 (which was generated from the now-deleted passphrase 222 and stored in the one-time programmable memory 402), which is required for cloning of the IC 102, is generally infeasible via physical examination. Further, a hacker may have to destroy a new copy of the programmed IC 102 with every hacking attempt, which would rapidly become expensive.

Figure 5:
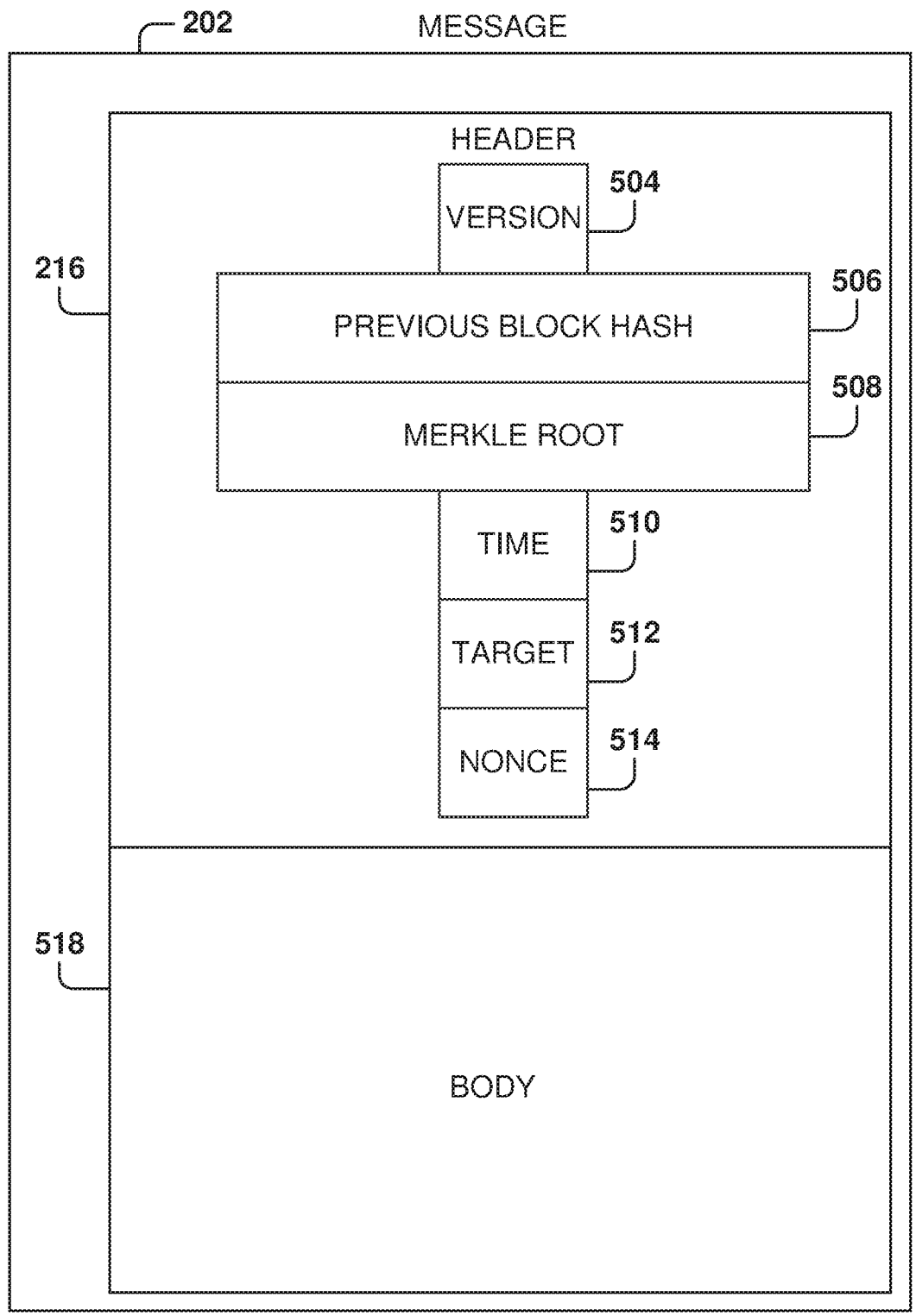
FIG. 5 shows the structure of a blockchain message, according to some embodiments.

FIG. 5 shows the structure of a blockchain message 202, according to some embodiments. Although some of the embodiments presented herein are described with reference to blockchain messages, the principles presented herein may be utilized with any other type of messages.

The message 202 includes a header 216 and a body 518. The header 216 includes information about the message 202, and the body 518 includes the information being transmitted, such as blockchain transactions.

The header includes a version 504 (e.g., 4 bytes), a previous block hash 506 (e.g., 32 bytes), a Merkle root 508 (e.g., 32 bytes), a timestamp 510 (e.g., 4 bytes), a target 512 (e.g., 4 bytes), and a nonce 514 (e.g., 4 bytes). The version 504 is used to keep track of upgrades and changes in the blockchain protocol. The previous block header hash 506 is the linkage into the previous block and secures the chain. The Merkle root 508 is a hash of the root of the Merkle tree of the block's transactions in the body 518.

Further, the timestamp 510 is the number of seconds since the first of January 1970 and the difficulty target 512 of the block identifies the number of zeroes to be found when hashing the block header 216 in order to meet the required level of proof of work to maintain the block time at 10 minutes.

The nonce 514 is a parameter that may be changed with the goal of obtaining a validation parameter (calculated from the header with the nonce value) that meets the target difficulty level required for the blockchain, for example, a predetermined leading number of zeros in the validation parameter (e.g., 17 zeros but the number of zeros may change over time based on network parameters). The nonce 514 value is altered by miners to try different permutations to achieve the difficulty level required or the first transaction of the Merkle root signifying the recipient of the block reward.

Figure 6:
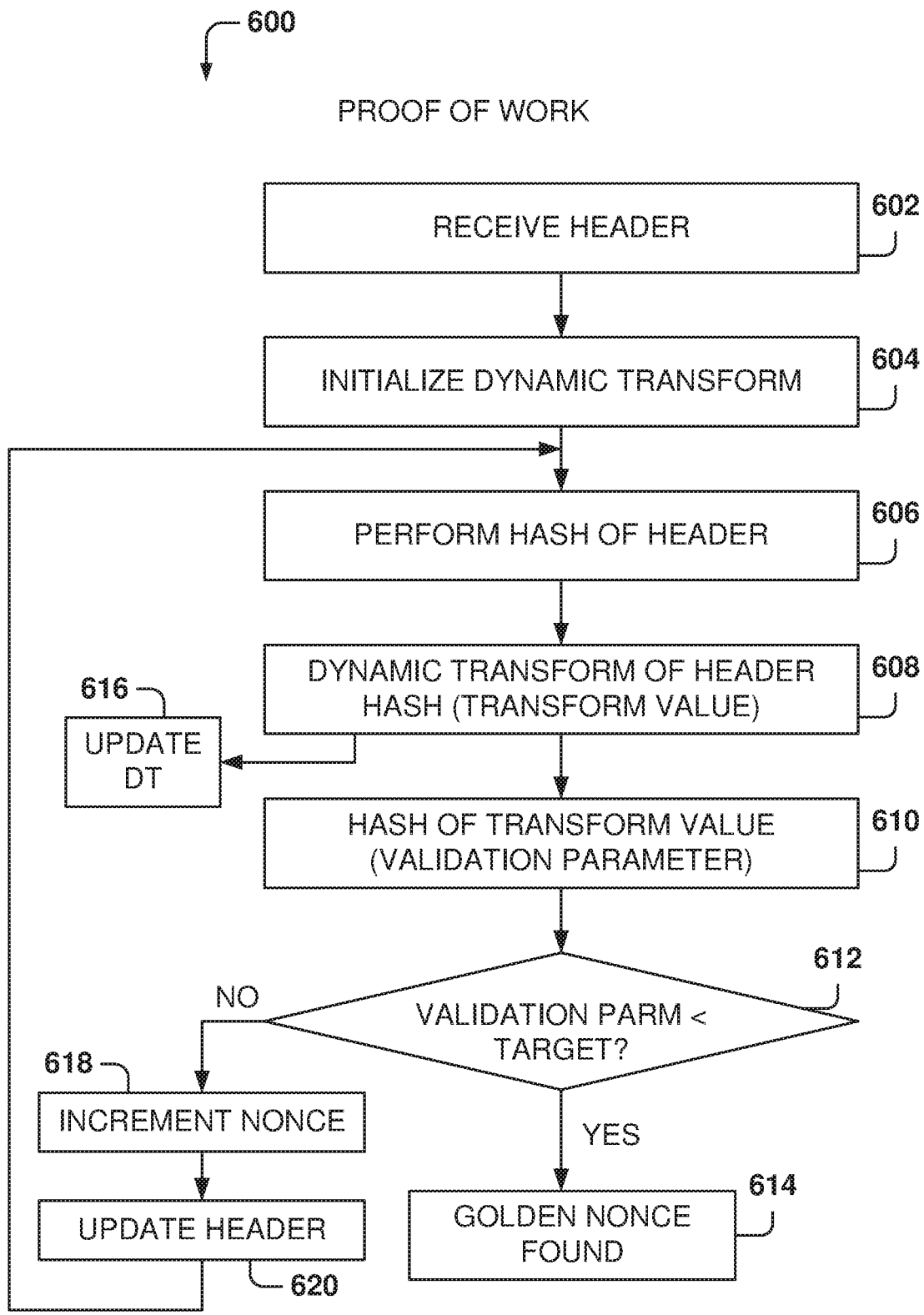
FIG. 6 is a flowchart of a method for generating a proof of work, according to some embodiments.

FIG. 6 is a flowchart of a method 600 for generating a proof of work, according to some embodiments. At operation 602, the header is received (e.g., by the core 106).

From operation 602, the method flows to operation 604 where the dynamic transform is initialized. The initial value of the dynamic transform is referred to as the seed and may be calculated based on one or more parameters, which may include one or more bits from the configuration key 108 (associated with the static transform 208), one or more bits from the header, one or more bits from the body of the input message, or combinations thereof. For example, the seed includes some bits from the configuration key 108, some bits from the nonce, and some bits that are a combination (e.g., a logical XOR operation) of bits from the configuration key and some bits from the nonce.

Any combination of bits may be used, as long as the process is clearly defined so other blockchain nodes may validate the operations using the same process to calculate the seed. In some example embodiments, the seed is a numerical value having 256 bits, but the seed may have other sizes.

At operation 606, the core 106 performs the hash of the header with the current value of the nonce. In some example embodiments, the initial value of the nonce is the value received in the header of the input message, but other initial values may also be applied.

The seed defines a dynamic transform to be applied to the hash of the header. In some example embodiments, the dynamic transform includes performing an XOR (exclusive logical OR) operation of each bit in the seed with a corresponding bit from the hash of the header. In other embodiments, other logical operations may be performed, such as logical AND, logical OR, or combinations thereof.

At operation 608, the dynamic transform of the hash of the header is performed, which results in a transform value. From operation 608, the method flows to operation 610. Additionally, after operation 608, the value of the dynamic transform is updated at operation 616. More details are provided below with reference to FIGS. 9-11 regarding the update of the dynamic transform.

The IC design includes a circuit that is dynamically reconfigured, at each cycle, to apply different POW calculations, at each cycle, based on one or more of: the input (e.g., header for validation), a modification of the dynamic transform circuit at each cycle, and the static transform. In some embodiments, the reconfiguration is not based on the static transform, and in other embodiments, the reconfiguration is not based on the input (e.g., is based on the value of the nonce register).

In some example embodiments, the reconfiguration is based on a portion of the nonce value, such as the ending 24 out of 32 bits, but other embodiments use fewer or more bits, such as 8, 16, 31, 32, etc., from the beginning, the middle, or the end of the nonce value.

In other example embodiments, the dynamic transform is based on a 32-bit checksum of the input, for example, the header with the current nonce value, or on a 24-bit checksum calculated using the odd-number bits in the input, or a 256-bit string calculated by seeding a PRBS circuit with the first 27 bits of the SHA hash of the input, etc.

The dynamic transform is calculated based on the input and results from previous-cycles, and the dynamic transform can be independently replicated given knowledge of the input value (e.g., the header). Thus, the dynamic transform (DT) is bit-sensitive to the input value, and the process of calculating the DT value involves complex operations that difficult attacks from malicious users.

At operation 610, a hash of the transform value is calculated and the result is referred to as the validation parameter. At operation 612, a check is made to determine if the validation parameter is below the target (e.g., enough number of leading zeros). If the validation parameter is below the target, the method 600 continues to operation 614, where a determination is made that the golden nonce has been found. The golden nonce is the nonce value that, when inserted into the header, generates the validation parameter that has the required number of leading zeros.

If the validation parameter is not below the target, the method 600 continues to operation 618, where the nonce is incremented for a new check of the header with the incremented nonce. In other embodiments, the nonce is changed in other ways, such as by adding a value greater than one to the nonce.

From operation 618, the method flows to operation 620, where the header is updated with the new value of the nonce. From operation 620, the method flows back to operation 606 to start the check of a new header beginning with the hash of the header.

It is noted that if the golden nonce is not found after a certain number of cycles, the process may abort, or the process may be aborted when an external signal is received to stop the proof-of-work operations.

Further, the DT may be used in other areas besides header POW, such as spam prevention, establishment of trust, etc.

Figure 7:
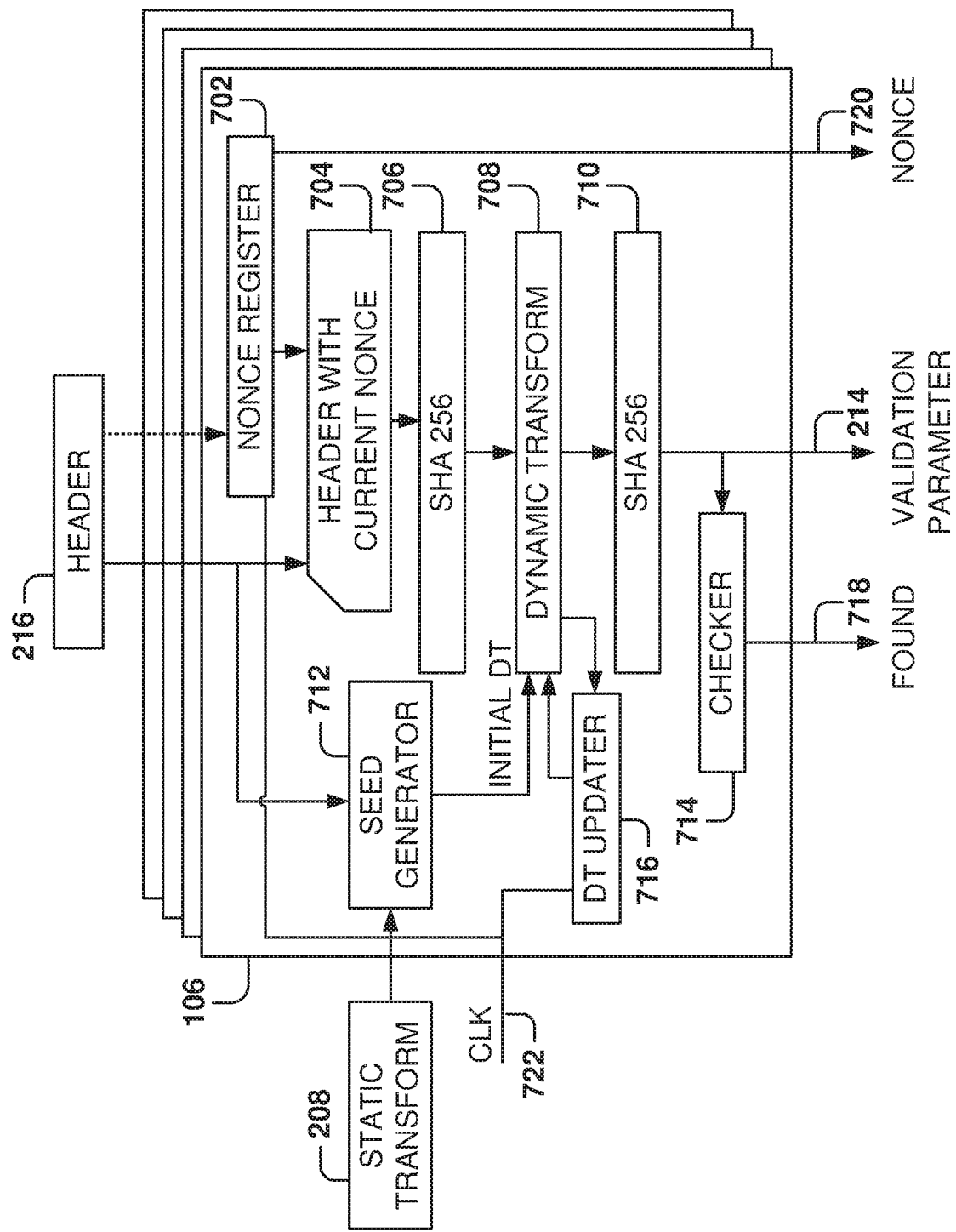
FIG. 7 illustrates the operation of the dynamic transform, according to some embodiments.

FIG. 7 illustrates the operation of the dynamic transform, according to some embodiments. The core 106 is one of a plurality of cores in the IC 102. The core 106 receives the header 216. In other example embodiments, the core 106 receives the input message 202 that includes the header 216 and the body 518.

In some example embodiments, the core 106 includes a nonce register 702, a first hash (SHA 256) 706, a dynamic transform 708, a second hash (SHA 256) 710, a seed generator 712, a dynamic transform updater 716, and a checker module 714. In other example embodiments, there may be additional transforms operating between the first hash 706 and the second hash 710, such as one or more static transforms.

The nonce register 702, is initialized with the nonce in the header 216, and the nonce register 702 is incremented each time a new value of the nonce is checked for proof of work, as described above with reference to FIG. 6. The value of the nonce register is transferred as nonce output 720.

Further, the seed generator 712 generates the seed that constitutes the initial value of the dynamic transform, and the seed generator 712 may use values from the static transform 208 (e.g., the configuration key 108), from the input message 202, or may use constant values (e.g., bits with a logical value of 0 or 1) during initialization for one or more bits.

In some example embodiments, the seed includes the ending 24 bits of the nonce register 702, but other seeds are also possible, such as by using more bits or fewer bits and different types of PRBS circuits. In this case, the seed does not depend on the value of the static transform 208.

After the dynamic transform is applied, as discussed above, the DT updater 716 updates the value of the DT for the next iteration of proof of work. Additionally, the checker module 714 determines if the validation parameter 214 meets the target (e.g., required number of leading zeros) and outputs a found value 718 indicating if the golden nonce has been found. The DT updater 716 includes a clock CLK 722 as an input and performs the updating of the dynamic transform after the required number of cycles for checking the value of the nonce. In some example embodiments, the clock CLK 722 also triggers the increment of the nonce register 702.

The first hash 706 performs the hash of the header 704 with the current value of the nonce register, then the dynamic transform is applied, followed by the second hash 710, to obtain the validation parameter 214.

It is noted that the embodiments illustrated in FIG. 7 are examples and do not describe every possible embodiment. Other embodiments may utilize different components, additional components, or combine the functionality of several components. For example, the checker module 714 may be located outside the core 106, in some embodiments. The embodiments illustrated in FIG. 7 should therefore not be interpreted to be exclusive or limiting, but rather illustrative.

Figure 8:
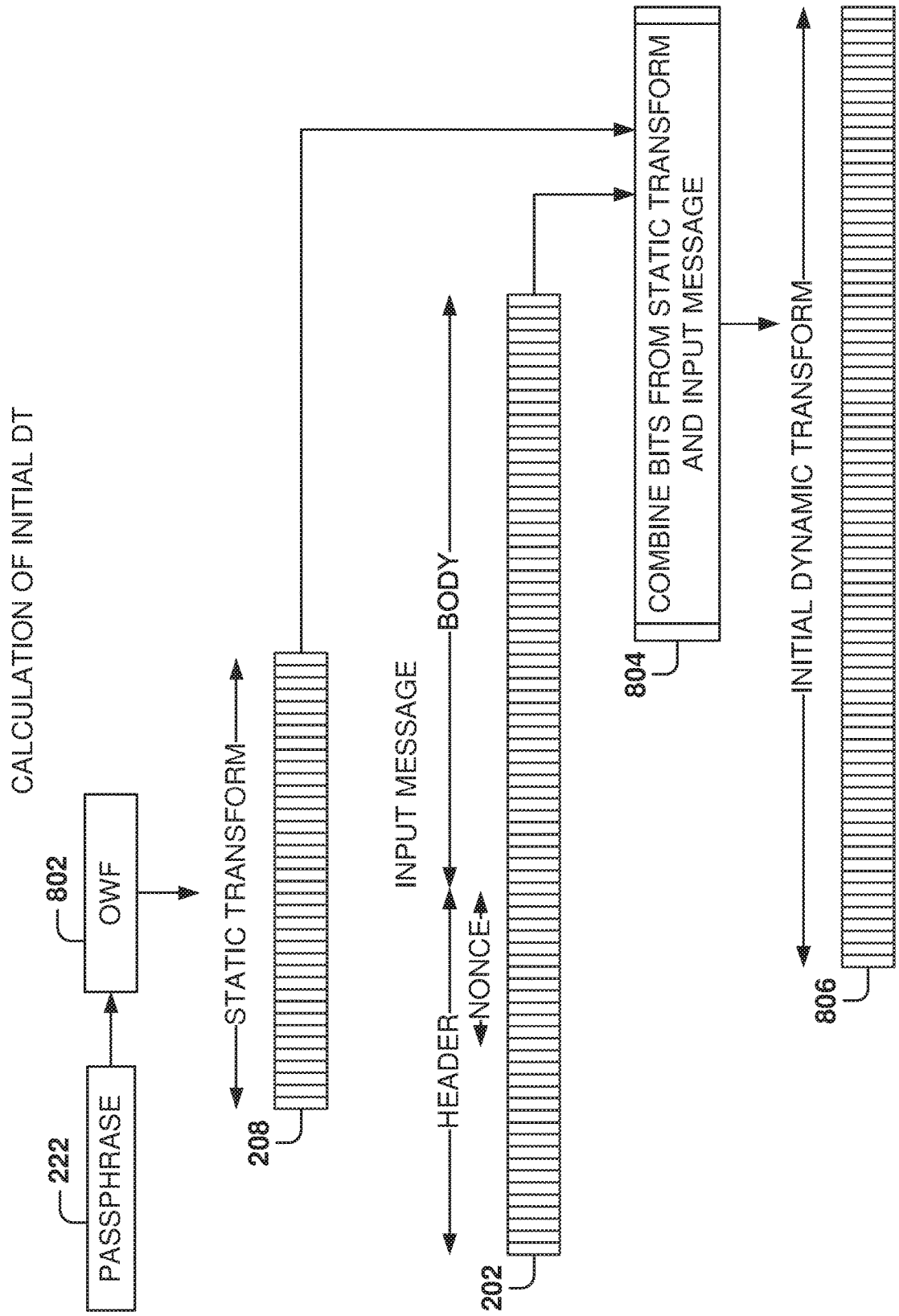
FIG. 8 illustrates the calculation of the initial value for the dynamic transform, according to some embodiments.

FIG. 8 illustrates the calculation of the initial value for the dynamic transform, according to some embodiments. As discussed above, the user enters a passphrase 222 and the static transform 208 is calculated, such as by performing an OWF 802 (e.g., SHA256) of the passphrase 222. The input message 202 includes the header, with a nonce, and the body. At operation 804, the bits from the static transform 208 and the input message 202 are combined to generate the initial dynamic transform 806.

For example, the initial DT includes one or more bits from the nonce and one or more bits from the static transform 208, and fixes one or more bits to a value of 0 or 1. For example, the initial DT includes 32 bits from the nonce and 224 bits from the static transform, or 32 bits from the nonce, 200 bits from the static transform, and then fills 24 bits with alternating zeros and ones. In another embodiment, the initial DT is a hash of the nonce. In yet another embodiment, the initial DT includes an XOR of the bits from a hash of the nonce and the bits from the static transform.

A person skilled in the art would readily appreciate that there are different ways to combine the static transform with information from the input message 202, as long as the process is well-defined and can be reproduced at other network nodes for proof-of-work validation.

Figure 9:
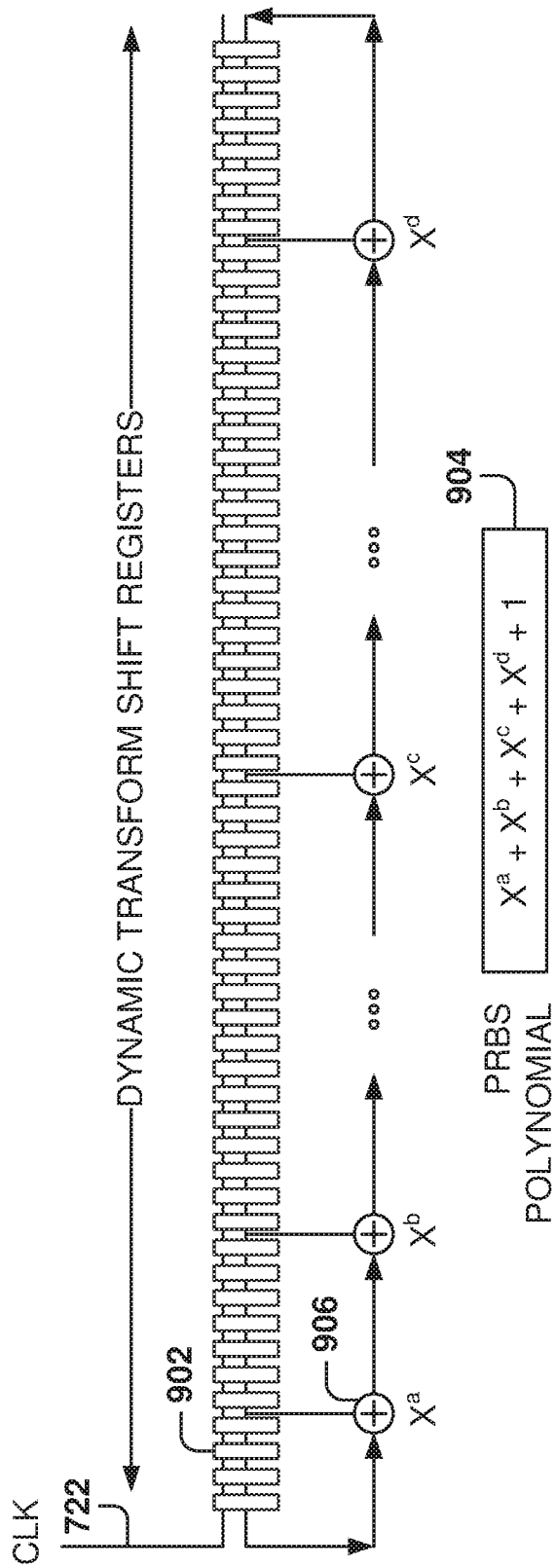
FIG. 9 illustrates the process for calculating the next dynamic transform using a pseudorandom binary sequence (PRBS), according to some embodiments.

FIG. 9 illustrates the process for calculating the next dynamic transform using a pseudorandom binary sequence (PRBS), according to some embodiments. In some example embodiments, the dynamic transform is implemented with registers 902, such as linear feedback shift registers (LFSR), and each register 902 represents one bit of the dynamic transform.

The LFSR is a shift register whose input bit is a linear function of its previous state. The most commonly used linear function of single bits is exclusive-or (XOR). Thus, an LFSR is most often a shift register whose input bit is driven by the XOR of some bits of the overall shift register value. The initial value of the LFSR is called the seed, and because the operation of the register is deterministic, the stream of values produced by the register is completely determined by its current (or previous) state. Because the register has a finite number of possible states, the LFSR will eventually enter a repeating cycle. An LFSR with a well-chosen feedback function can produce a sequence of bits that appears random and has a very long cycle.

To calculate the next DT, the registers 902 are shifted to the right, although other embodiments may shift to the left, according to a PRBS polynomial. A PRBS is a binary sequence that, while generated with a deterministic algorithm, is difficult to predict and exhibits statistical behavior similar to a truly random sequence.

The PRBS is defined by the position of the XOR gates 906 that are expressed as the PRBS polynomial 904. In the example of FIG. 9, the XOR gates are at positions a, b, c, and d, which define the polynomial $X^a+X^b+X^c+X^d+1$ 904. The XOR gate 906 at position n defines the coefficient of $X^n$ as 1, otherwise the coefficient at position n is 0 so there will be no term in the polynomial 904 for position n. The coefficient for $X^0$ (position 0) is defined as 1.

Some common sequence generating polynomials are:

$$PRBS7=x^7+x^6+1$$

$$PRBS9=x^9+x^5+1$$

$$PRBS15=+x^{15}+x^{14}+1$$

$$PRBS31=x^{31}+x^{28}+1$$

After the CLK 722 triggers, the dynamic transform shifts the values of the registers as defined by the PRBS polynomial 904. The triggering of the shift may be performed at every cycle of the clock or every several clock cycles.

The PRBS of FIG. 9 includes 256 bits and may be applied directly to the output of the first hash SHA transform. This way, the DT changes every cycle, but in a predictable manner that may be reproduced for validating proof-of-work.

In some example embodiments, when applying the dynamic transform to a given variable, an XOR logical operation is performed for each bit of the given variable with the corresponding bit of the shift register 902 of the dynamic transform. For example, if the shift register 902 for bit 25 is 0 and bit 25 of the given variable is 1, then the resulting bit 25 of the result will be 1 (e.g., the logical XOR of 0 and 1).

Figure 10:
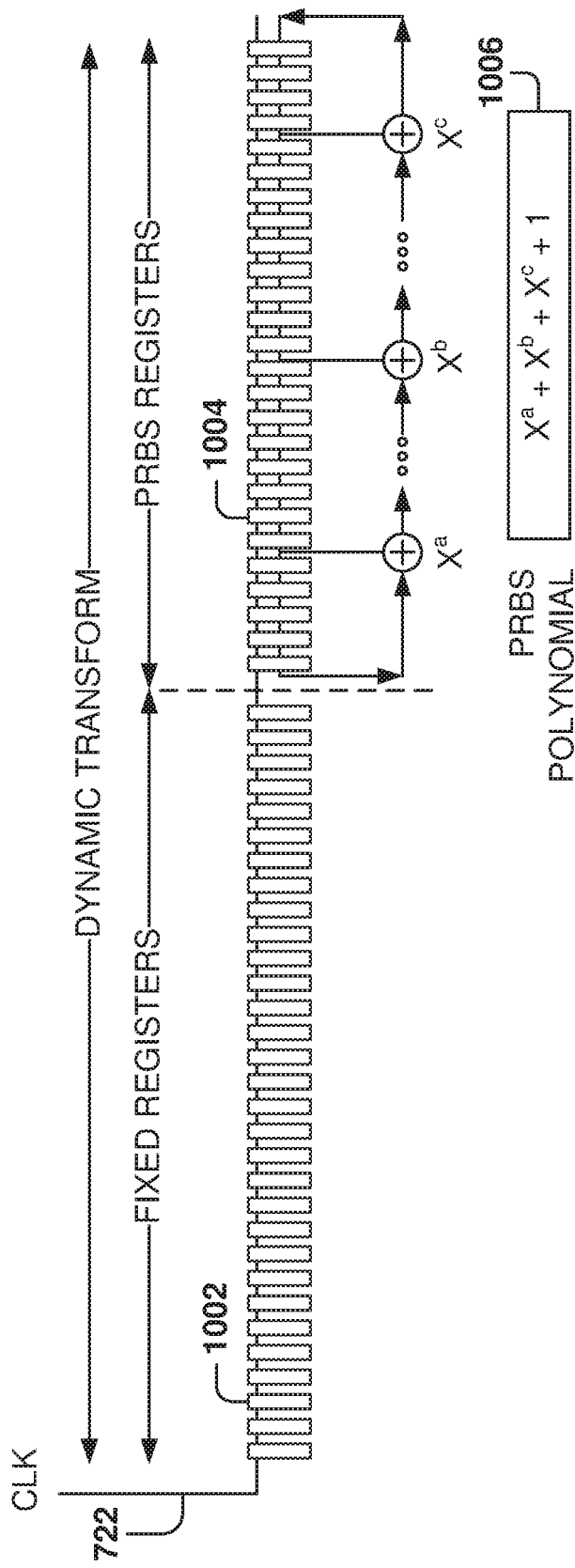
FIG. 10 illustrates the process for calculating the next dynamic transform when using partial PRBS, according to some embodiments.

FIG. 10 illustrates the process for calculating the next dynamic transform when using partial PRBS, according to some embodiments. In some example embodiments, a PRBS, with a fewer number of registers than bits in the static transform, is used by combining the PRBS with other values, such as some bits from the static transform (e.g., first 225 bits from the static transform) or some constant bits (e.g., first 100 bits set to alternating zeros and ones).

In the example illustrated in FIG. 10, a first portion of the dynamic transform is set to a fixed value, such as the beginning (or some other section) of the static transform, all zeros, all ones, alternating zeros and ones, and so forth. The second portion of the dynamic transform is implemented using a PRBS (e.g., PRBS31 with 32 registers).

When the CLK 722 triggers the updating of the dynamic transform, the fixed registers 1002 do not change and the PRBS registers 1004 change according to the PRBS polynomial 1006. The resulting updated dynamic transform is then used for the next transform operation.

Figure 11:
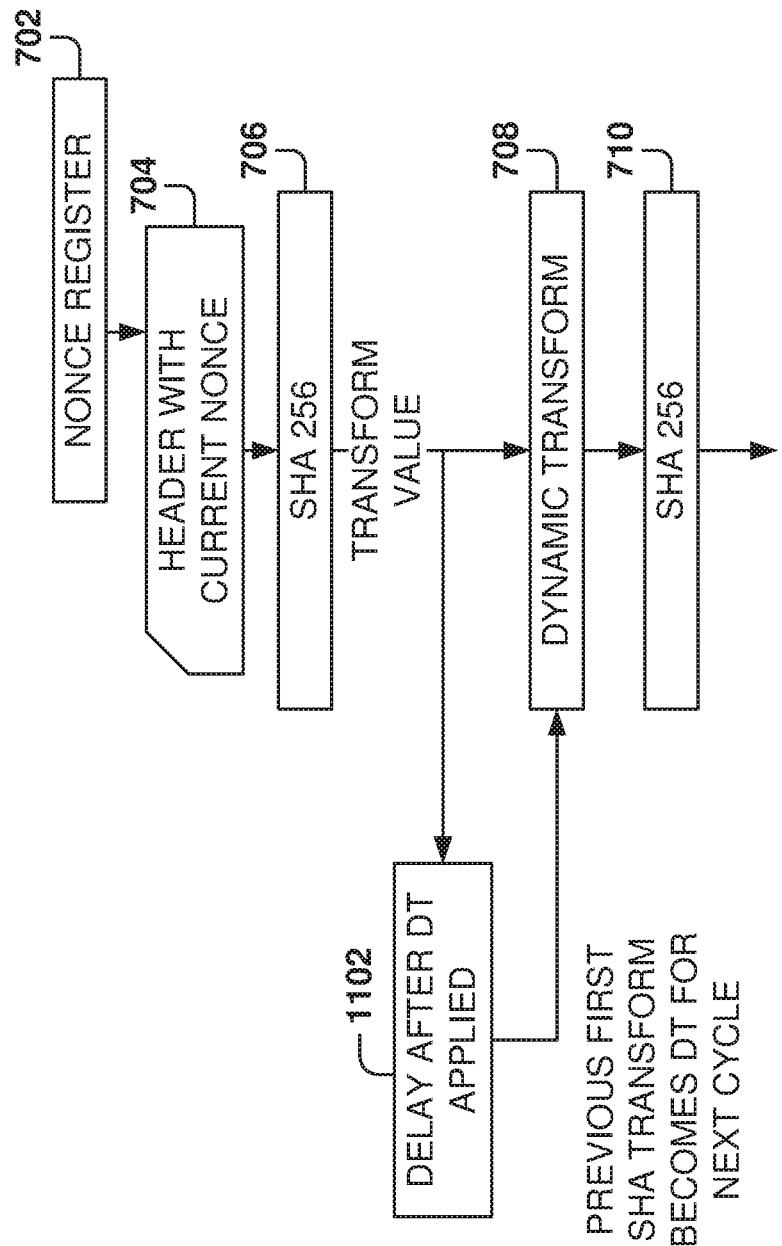
FIG. 11 illustrates the calculation of the next dynamic transform when using the value of the previous first Secure Hash Algorithm (SHA) transformation, according to some embodiments.

FIG. 11 illustrates the calculation of the next dynamic transform when using the value of the previous first SHA transformation, according to some embodiments. In some example embodiments, the dynamic transform is based on the transform value resulting from the hash of the previous checked header (e.g., the header with a nonce value equal to the current nonce value minus one, and not the header from the previous blockchain).

The value of the transform value is saved and then the dynamic transform is configured with the transform value for the next proof-of-work check of the header. This way, if the golden nonce is found, it is easy to know the value of the dynamic transform used to calculate the header with the golden nonce because the dynamic transform is equal to the hash of the header with a nonce equal to the previous value of the nonce (e.g., nonce−1).

In some example embodiments, after the first hash 706 of the header 704 is performed, the value is stored in registers. After the dynamic transform 708 is applied to the transform value (result from hash 706), the dynamic transform is updated 1102 after a predetermined delay (e.g., in the next clock cycle).

This way, the dynamic transform is dynamic because it changes with every nonce value. Trying to reproduce the same process in software would be much slower than when using the core 106 (e.g., an ASIC device). Thus, a malicious user that tried to perform the validation quickly to attack the block chain network would not be able to perform the calculations faster in software than in hardware and would not be able to attack the blockchain network.

In some example embodiments, the initial value for the dynamic transform may be set as the OWF of the header with (nonce−1) for consistency, but other initial values may also be used (e.g., all zeros, all ones, or alternating zeros and ones).

The update of the dynamic transform using the transform value of the previous header may also be combined with the use of PRBS, as described above with reference to FIGS. 9 and 10. For example, the dynamic transform could be updated by performing an XOR of the updated PRBS value and the transform value.

Figure 12:
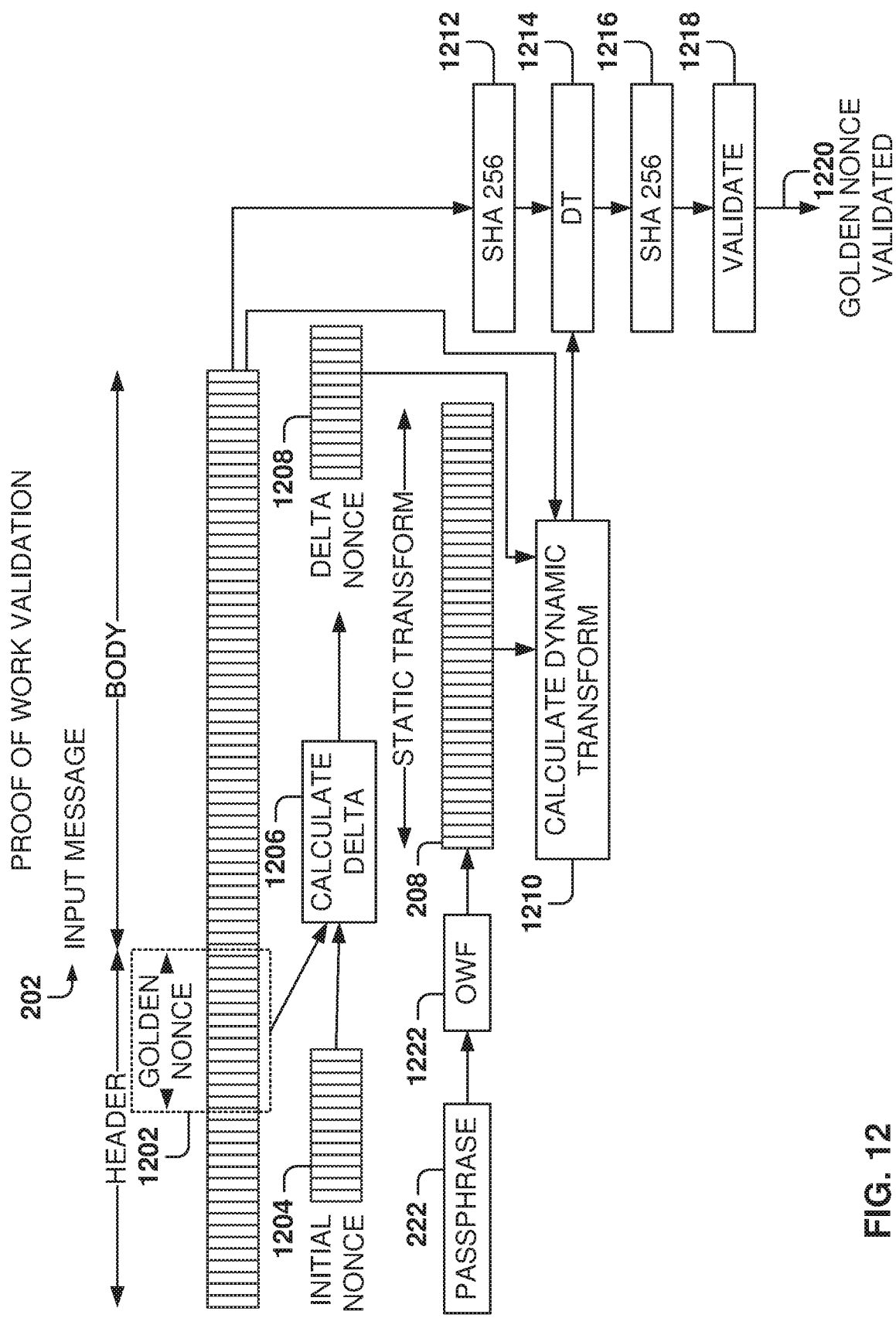
FIG. 12 illustrates a process for validating proof of work, according to some embodiments.

FIG. 12 illustrates the process for validating proof of work, according to some embodiments. After a node finds the golden nonce that meets the target requirement, the node sends the header to other nodes for validation. Each receiving node then validates the proof-of-work by recalculating the validation parameter and verifying the validation target.

The input message 202 includes the golden nonce 1202. At operation 1206, the delta, or difference, between the golden nonce 1202 and the initial nonce 1204, which is the value of the nonce received by the core 106 to start checking headers, is calculated, which results in a value of delta nonce 1208. In some embodiments, operation 1206 is optional if the dynamic transform is not a function of the initial nonce 1204 (e.g., dynamic transform is based on the transform value of the previous nonce as described with reference to FIG. 11).

Additionally, as described earlier, the OWF 1222 of the passphrase 222 results in the static transform 208. At operation 1210, the dynamic transform value is calculated based on the delta nonce 1208, the static transform 208, and the input message 202. Calculating the dynamic transform requires following the same process followed for POW. However, when doing POW, the core 106 dynamically changes the dynamic transform for each nonce value, so calculating the dynamic transform for the given golden nonce 1202 requires replicating this process. For example, when using PRBS, the value of the random number for the given nonce is calculated to determine the dynamic transform.

In the embodiment of FIG. 12, the dynamic transform is calculated as the OWF of the header with a nonce value equal to (golden nonce−1).

Once the dynamic transform is calculated, the header is validated by performing the SHA 256 1212, followed by the DT 1214, and a second SHA 256 1216, which results in the validation parameter, which is then validated at operation 1218 to determine if the required number of leading zeros is present. The result 1220 indicates if the validation has been successful or not.

One of the advantages of the operation of the DT with PRBS is that it makes replicating the operation in software straightforward by utilizing a software program that implements PRBS, such as the stand( ) function in the Linux implementation of the C programming language.

In some example embodiments, replicating the DT in software includes the following operations: selecting part of the header, using the selection as the seed of the srand( ) function, and using the result of the srand( ) function for the POW operation.

In some example embodiments, using the result of the srand( ) function for the POW operation may be performed in software as follows:

1. Calculate 1212 the SHA2-256 hash of the input value;
2. Combine 1210 the binary string returned by srand( ) with a pre-existing static transform value using bit-by-bit XOR operation to create the dynamic transform function;
3. Apply the dynamic transform function 1214 to the SHA2-256 hash of the input value; and
4. Calculate 1216 the SHA2-256 hash of the result of applying the dynamic transform to get the POW value (e.g., the validation parameter 214).
5. Check 1218 if the validation parameter 214 meets the validity criteria for POW.

This approach results in the following benefits:

1. Reduces the amount of hardware resources required for network nodes. For example, any device capable of running C may be a network node to validate POW.
2. Increases the number of potential software developers. The requirement to be a developer is to have a working understanding of the C language and the C APIs (Application Programming Interfaces), which makes for a large pool of potential software developers.
3. Enables cross-compiling of the networking protocol, that is, enable the reference implementation of the networking protocol to directly cross-compile across multiple platforms (e.g., Android®, IoS®, MacOS®, Windows®).
4. Enable duplication in software of the operations performed by the IC in hardware.

Figure 13:
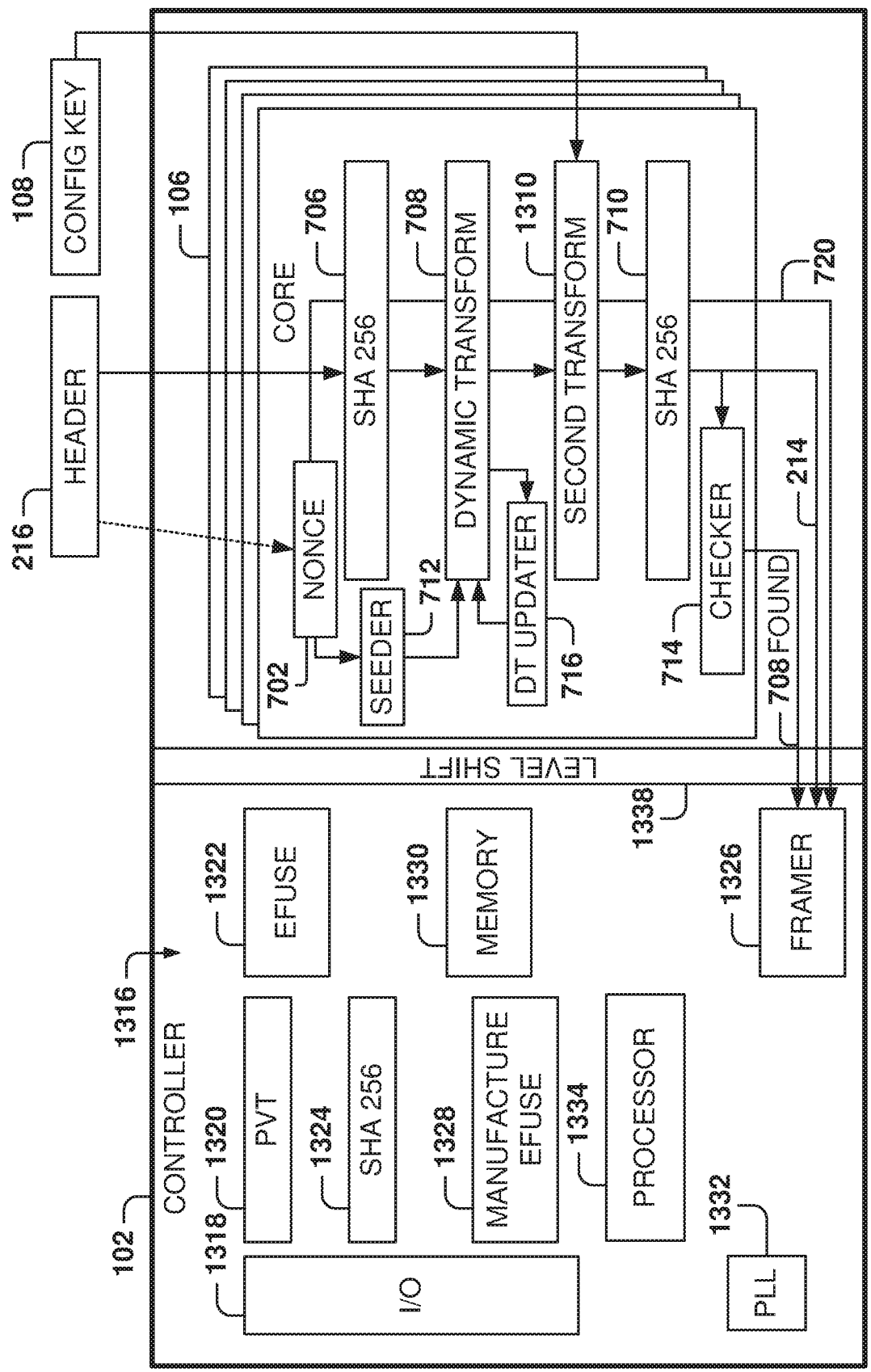
FIG. 13 illustrates an integrated circuit with a plurality of cores for proof-of-work operations, according to some embodiments.

FIG. 13 illustrates an integrated circuit 102 with a plurality of cores 106 for proof-of-work operations, according to some embodiments. The IC 102 also includes controller 1316 that manages operations of the cores 106.

The controller communicates with the different cores 106 and assigns POW tasks to the different cores. For example, to validate a header 216, the controller assigns POW tasks to the different cores by assigning a different starting nonce value. If a core 106 finds the golden nonce, then the core 106 communicates to the controller that the nonce has been found via output 708. The controller then stops the other cores from the POW and assign a new task.

The controller 1316 includes input/output (I/O) ports 1318, Process-Voltage-Temperature (PVT) 1320, efuse 1322, SHA 256 1324, manufacture efuse 1328, framer 1326, memory 1330, processor 1334, and Phase-Locked Loop (PLL) 1332. The memory may include program instructions that may be executed by the processor 1334.

Further, a level shift 1338 separates the voltage level of the controller from the voltage levels of the cores, which operate at a lower level. One of the goals of POW is to use as little energy as possible, so having cores 106 that perform at low voltage allows calculating hashes using a small amount of energy. The framer 1326 communicates with, assigns tasks to, and receives results from the cores 106.

In the example embodiment of FIG. 13, the core 106 includes a dynamic transform 708 and a second transform 1310, which is a static transform. In other embodiments, the static transform is not included. Further, one or more dynamic transforms 708 may be combined with one or more static transforms 1310, in any order, in order to generate the validation parameter. As long as the process can be reproduced by a similar integrated circuit, any combination is possible. In some embodiments, the static transform, is performed ahead of the dynamic transform 708.

It is noted that the embodiments illustrated in FIG. 13 are examples and do not describe every possible embodiment. Other embodiments may utilize different modules, distribute functionality across multiple modules, combined functionality of two or more modules, etc. The embodiments illustrated in FIG. 13 should therefore not be interpreted to be exclusive or limiting, but rather illustrative.

Figure 14A:
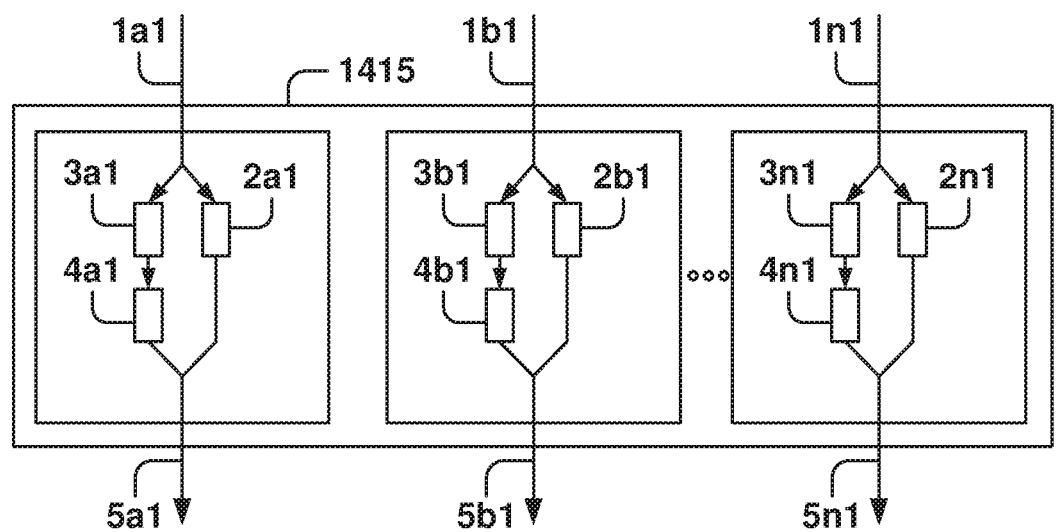
FIG. 14A illustrates an example programmable transform block configuration prior to coding the transformation function, in accordance with embodiments disclosed herein.

FIG. 14A illustrates an example programmable transformation block 1415 configuration prior to being coded, in accordance with embodiments of the technology disclosed herein. The programmable transformation block 1415 includes sets of programmable circuitry defining the transformation function represented by the configuration key 108 (illustrated in FIG. 14B). In various embodiments, the programmable transformation block 1415 is configured to enable one of a plurality of transposition operations, whereby one or more bits of input data (e.g., $1a1$, $1b1$) are transposed with another bit of the input data to generate a modified output data (e.g., $5a1$, $5b1$). In other embodiments, the programmable transformation block 1415 is configured to enable one of a plurality of direct bit inversion, or bit flipping, operations, whereby one or more bits of input data are flipped to generate modified output data.

Various embodiments utilizing a direct bit inversion transformation scheme as described herein may be implemented to take advantage of the fact that a 256-bit binary configuration key provides a succinct means to enable access to the full key space provided by the programmable transformation function (e.g., static transform 208). That is, 256 bits is the minimum length necessary to enable the user to specify which one among 256 distinct transformations is to be performed by the programmable transformation function 215 on the first hash 206 or used to initialize the dynamic transform. Using a direct bit inversion transformation scheme may also enable the use of a minimal amount of new circuit elements to embody the transformation function as datapath circuitry. This is important because the fact that the transformation function is embodied as datapath circuitry means that any additional circuitry placed on the datapath will operate at line speed and result in an overall degradation of the performance of the transform-enabled integrated circuit 102 as a whole.

A direct bit inversion transformation scheme may also provide a straightforward means to disable all effects of the programmable transformation by simply setting all values in the 256 bit configuration key to zero. Such a key may be referred to as a null key. One result of this is that it simplifies the process of configuring a transform-enabled integrated circuit 102 so that it operates in a manner undistinguishable from that of a comparable integrated circuit not incorporating the programmable transformation function. The practical result of this is that integrated circuits incorporating the technology described herein may easily be configured to operate in the same manner as standard bitcoin mining ASICs and be used to mine bitcoins with no particular difficulty, (aside from and in addition to being able to operate in manners that are not replicable by bitcoin mining ASICs not incorporating the technology described herein).

Figure 14B:
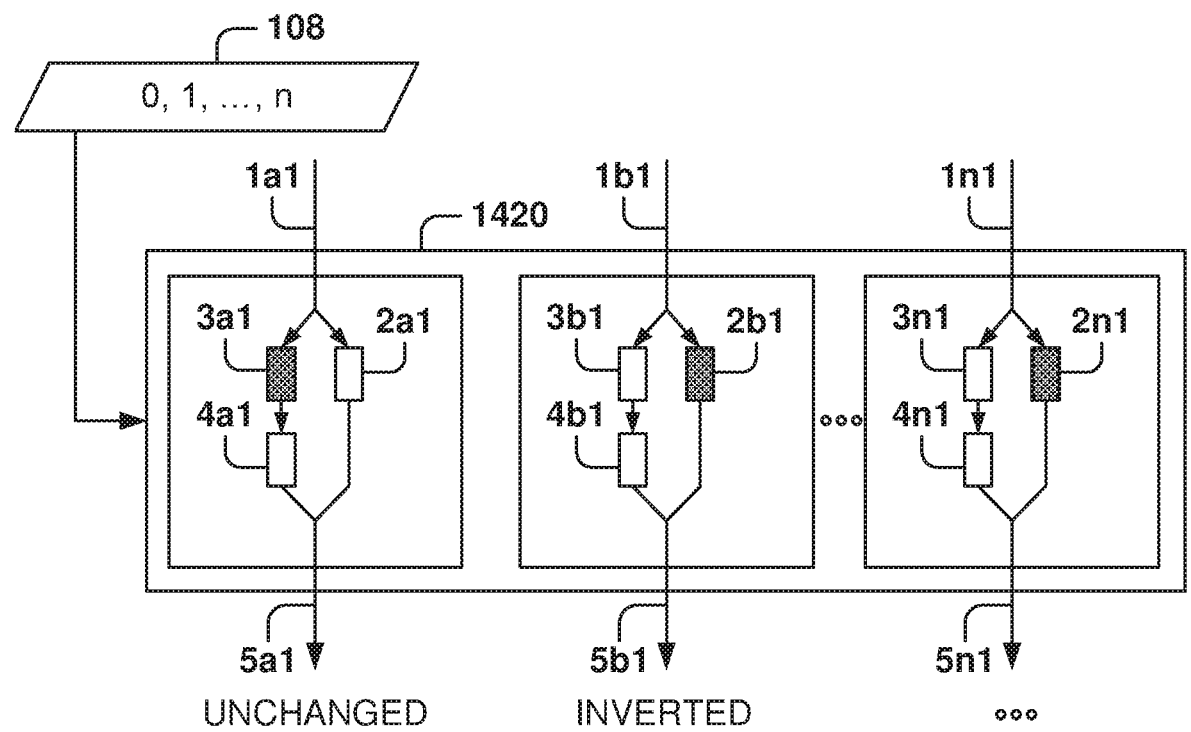
FIG. 14B illustrates an example programmable transform block coded according to a binary key, according to some embodiments.

For ease of discussion, FIGS. 14A and 14B are discussed with reference to a direct bit inversion configuration, but other configurations may also be applied (e.g., combining two bits from the configuration key to configure one bit of the static transform).

The coding of the programmable transformation block is illustrated in FIG. 14B. The example programmable transformation block 1420 is shown being coded in accordance with the configuration key 108. To indicate the configuration key 108 embodied within the programmable transformation block 1420, shaded boxes are used to indicate that a micro-fuse has been disabled (e.g., stopping data from flowing through the disabled micro-fuse). For instance, in the illustrated example, when micro-fuse 3a1 is disabled, the input bit 1a1 flows through the programmable transformation block 1420 unchanged because the input bit 1a1 travels through micro-fuse 2a1 unchanged. The result is that output bit 5a1 is equal to input bit 1a1.

When micro-fuse 2b1 is disabled, the input bit flows through the micro-fuse 3b1 and then is inverted by the bit flipper 4b1, and the result is bit 5b1 that is equal to 1b1 inverted.

Figure 15:
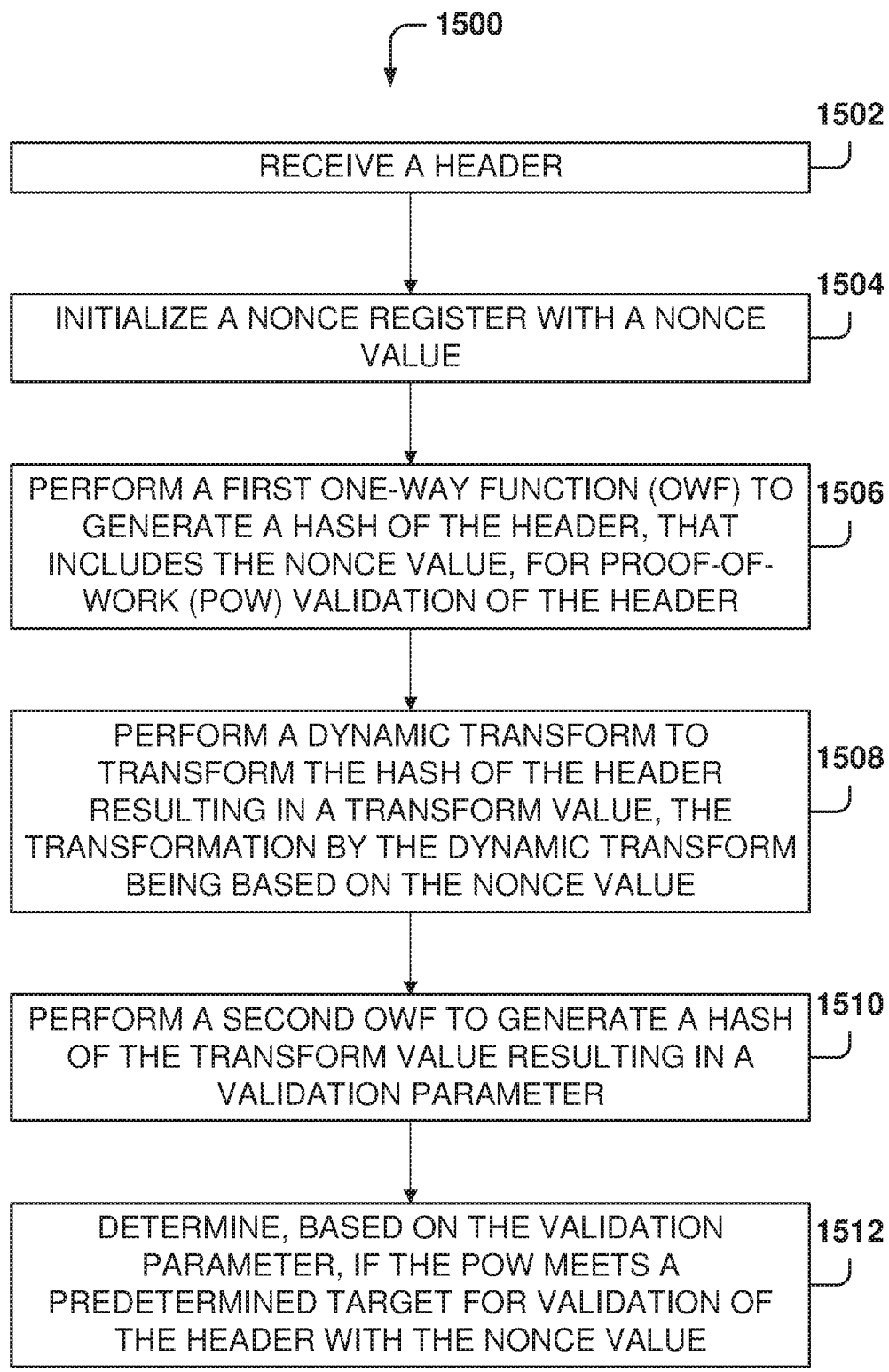
FIG. 15 is a flowchart of a method for performing proof-of-work operations, according to some example embodiments.

FIG. 15 is a flowchart of a method 1500 for performing proof-of-work operations, according to some example embodiments. While the various operations in this flowchart are presented and described sequentially, one of ordinary skill will appreciate that some or all of the operations may be executed in a different order, be combined or omitted, or be executed in parallel.

At operation 1502, a header is received. From operation 1502, the method flows to operation 1504 for initializing a nonce register with a nonce value.

Further, at operation 1506, a first OWF is performed to generate a hash of the header, that includes the nonce value, for POW validation of the header.

From operation 1506, the method flows to operation 1508 for performing a dynamic transform to transform the hash of the header resulting in a transform value. In some example embodiments, the transformation by the dynamic transform is based on the nonce value.

From operation 1508, the method flows to operation 1510 where a second OWF is performed to generate a hash of the transform value resulting in a validation parameter.

Operation 1512, is for determining, based on the validation parameter, if the POW meets a predetermined target for validation of the header with the nonce value.

In one example, performing the dynamic transform comprises performing a logical XOR operation of each bit of the hash of the header with a corresponding bit value associated with the dynamic transform.

In one example, the method 1500 further comprises calculating a static transform binary value based on a passphrase, and initializing a dynamic transform circuit, for performing the dynamic transform, with a value based on the nonce value and the static transform binary value.

In one example, the method 1500 further comprises, when the validation parameter does not meet the predetermined target, incrementing the nonce value in the nonce register, and using a new header, after incrementing the nonce value, for a new POW operation.

In one example, the dynamic transform is performed by a dynamic transform circuit that comprises one or more LFSRs, and the method 1500 further comprises updating the LFSRs, before the new POW operation, based on a PRBS.

Figure 16:
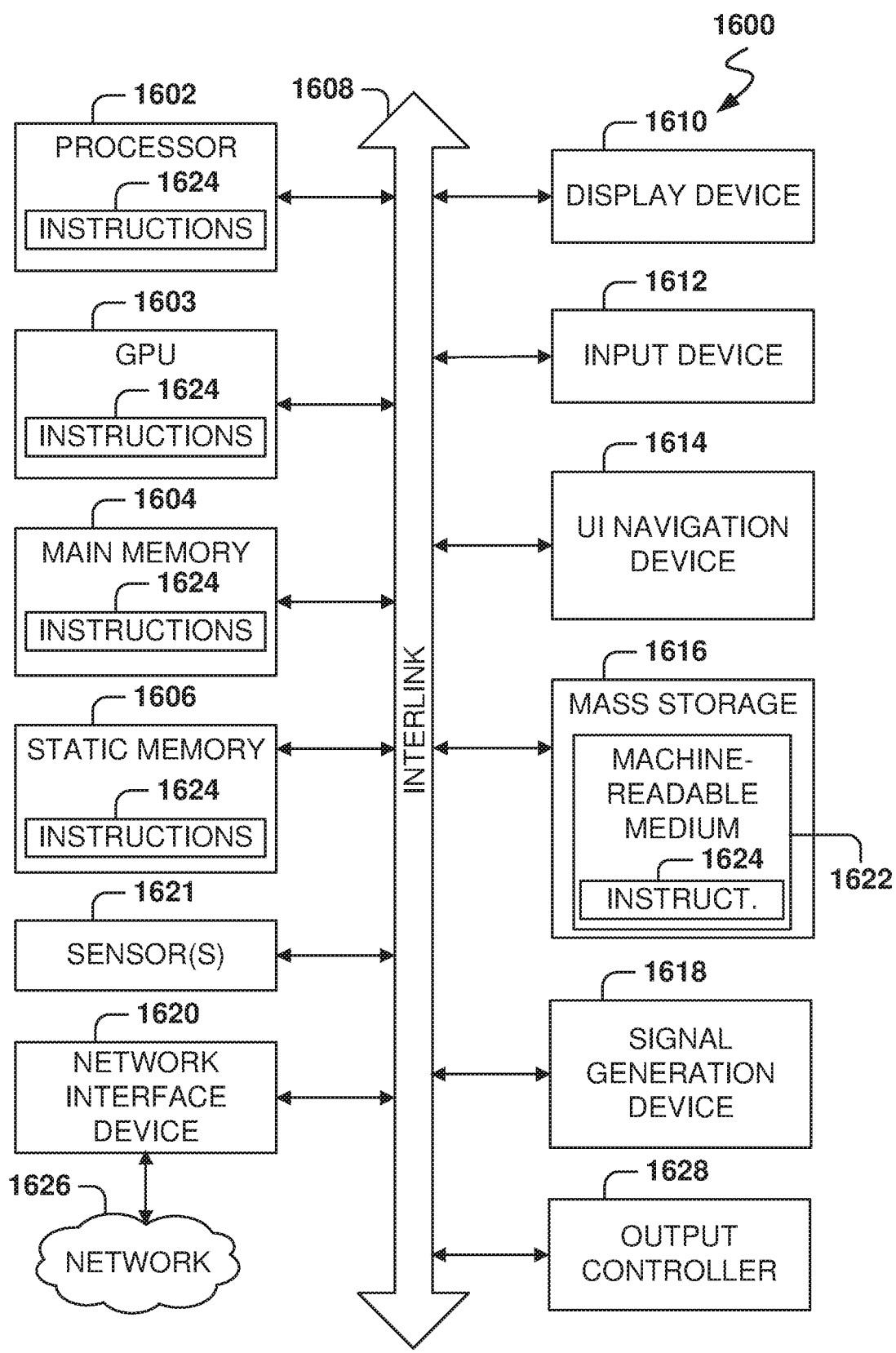
FIG. 16 is a block diagram illustrating an example of a machine upon or by which one or more example process embodiments described herein may be implemented or controlled.

FIG. 16 is a block diagram illustrating an example of a machine upon or by which one or more example process embodiments described herein may be implemented or controlled. In alternative embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in a peer-to-peer (P2P) (or other distributed) network environment. Further, while only a single machine 1600 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1600 may include a hardware processor 1602 (e.g., a central processing unit (CPU), a hardware processor core, or any combination thereof), a graphics processing unit (CPU) 1603, a main memory 1604, and a static memory 1606, some or all of which may communicate with each other via an interlink (e.g., bus) 1608. The machine 1600 may further include a display device 1610, an alphanumeric input device 1612 (e.g., a keyboard), and a user interface (UI) navigation device 1614 (e.g., a mouse). In an example, the display device 1610, alphanumeric input device 1612, and UI navigation device 1614 may be a touch screen display. The machine 1600 may additionally include a mass storage device (e.g., drive unit) 1616, a signal generation device 1618 (e.g., a speaker), a network interface device 16:20, and one or more sensors 1621, such as a Global Positioning System (GPS) sensor, compass, accelerometer, or another sensor. The machine 1600 may include an output controller 1628, such as a serial (e.g., universal serial bus (USB)), or other wired or wireless (e.g., infrared (IR), near field communication (NFC), etc.) connection to communicate with or control one or more peripheral devices (e.g., a printer, card reader, etc.).

The mass storage device 1616 may include a machine-readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within the static memory 1606, within the hardware processor 1602, or within the GPU 1603 during execution thereof by the machine 1600. In an example, one or any combination of the hardware processor 1602, the CPU 1603, the main memory 1604, the static memory 1606, or the mass storage device 1616 may constitute machine-readable media.

While the machine-readable medium 1622 is illustrated as a single medium, the term "machine-readable medium" may include a single medium, or multiple media, (e.g., a centralized or distributed database, and/or associated caches and servers) configured to store the one or more instructions 1624.

The term "machine-readable medium" may include any medium that is capable of storing, encoding, or carrying instructions 1624 for execution by the machine 1600 and that cause the machine 1600 to perform any one or more of the techniques of the present disclosure, or that is capable of storing, encoding, or carrying data structures used by or associated with such instructions 1624. Non-limiting machine-readable medium examples may include solid-state memories, and optical and magnetic media. In an example, a massed machine-readable medium comprises a machine-readable medium 1622 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device 1620.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An integrated circuit comprising:
 a nonce register for storing a nonce value;
 a first one-way function (OWF) circuit configured to generate a hash of a header, the header including the nonce value for proof-of-work (POW) validation of the header;
 a dynamic transform circuit configured to transform the hash of the header to generate a transform value, the transformation by the dynamic transform circuit being based on the nonce value; and
 a second OWF circuit configured to generate a hash of the transform value to obtain a validation parameter, the validation parameter determining whether the POW meets a predetermined target for validation of the header with the nonce value.

2. The integrated circuit as recited in claim 1, wherein the dynamic transform circuit transforms the hash of the header by performing a logical XOR operation of each bit of the hash of the header with a corresponding bit value of the dynamic transform circuit.

3. The integrated circuit as recited in claim 1, further comprising:
 a static transform circuit associated with a static transform binary value, the static transform binary value being based on a passphrase.

4. The integrated circuit as recited in claim 3, wherein the dynamic transform circuit is initialized with a value based on the nonce value and the static transform binary value.

5. The integrated circuit as recited in claim 1, wherein the nonce value is incremented in the nonce register when the validation parameter does not meet the predetermined target and a new header with the incremented nonce value is used for a new POW operation.

6. The integrated circuit as recited in claim 5, wherein the dynamic transform circuit comprises one or more linear feedback shift registers (LFSRs) that are updated, before the new POW operation, based on a pseudorandom binary sequence (PRBS).

7. The integrated circuit as recited in claim 5, wherein the dynamic transform circuit is updated, before the new POW operation, based on the transform value before the nonce register is incremented.

8. The integrated circuit as recited in claim 1, wherein a node in a network validates POW for a golden nonce based on a value of the golden nonce and a state of the dynamic transform circuit corresponding to the golden nonce.

9. The integrated circuit as recited in claim 1, wherein the header is a blockchain header corresponding to a message body, wherein the header further comprises a previous block hash, a Merkle root of information in the message body, a timestamp, and a target accuracy.

10. The integrated circuit as recited in claim 1, wherein the integrated circuit comprises outputs including a golden nonce found, the validation parameter, and the nonce value.

11. A method implemented by an electronic circuit, the method comprising:
   receiving a header;
   initializing a nonce register with a nonce value;
   performing a first one-way function (OWF) to generate a hash of the header, that includes the nonce value, for proof-of-work (POW) validation of the header;
   performing a dynamic transform to transform the hash of the header resulting in a transform value, the transformation by the dynamic transform being based on the nonce value;
   performing a second OWF to generate a hash of the transform value resulting in a validation parameter; and
   determining, based on the validation parameter, whether the POW meets a predetermined target for validation of the header with the nonce value.

12. The method as recited in claim 11, wherein performing the dynamic transform comprises:
   performing a logical XOR operation of each bit of the hash of the header with a corresponding bit value associated with the dynamic transform.

13. The method as recited in claim 11, further comprising:
   calculating a static transform binary value based on a passphrase; and
   initializing a dynamic transform circuit, for performing the dynamic transform, with a value based on the nonce value and the static transform binary value.

14. The method as recited in claim 11, further comprising:
   when the validation parameter does not meet the predetermined target, incrementing the nonce value in the nonce register; and
   using a new header, after incrementing the nonce value, for a new POW operation.

15. The method as recited in claim 14, wherein the dynamic transform is performed by a dynamic transform circuit that comprises one or more linear feedback shift registers (LFSRs), the method further comprising:
   updating the LFSRs, before the new POW operation, based on a pseudorandom binary sequence (PRBS).

16. A non-transitory machine-readable storage medium including instructions that, when executed by a machine, cause the machine to perform operations comprising:
   receiving a header;
   initializing a nonce register with a nonce value;
   performing a first one-way function (OWF) to generate a hash of the header, that includes the nonce value, for proof-of-work (POW) validation of the header;
   performing a dynamic transform to transform the hash of the header resulting in a transform value, the transformation by the dynamic transform being based on the nonce value;
   performing a second OWF to generate a hash of the transform value resulting in a validation parameter; and
   determining, based on the validation parameter, whether the POW meets a predetermined target for validation of the header with the nonce value.

17. The non-transitory machine-readable storage medium as recited in claim 16, wherein performing the dynamic transform comprises:
   performing a logical XOR operation of each bit of the hash of the header with a corresponding bit value associated with the dynamic transform.

18. The non-transitory machine-readable storage medium as recited in claim 16, wherein the machine further performs operations comprising:
   calculating a static transform binary value based on a passphrase; and
   initializing a dynamic transform circuit, for performing the dynamic transform, with a value based on the nonce value and the static transform binary value.

19. The non-transitory machine-readable storage medium as recited in claim 16, wherein the machine further performs operations comprising:
   when the validation parameter does not meet the predetermined target, incrementing the nonce value in the nonce register; and
   using a new header, after incrementing the nonce value, for a new POW operation.

20. The non-transitory machine-readable storage medium as recited in claim 19, wherein the dynamic transform is performed by a dynamic transform circuit that comprises one or more linear feedback shift registers (LFSRs), wherein the machine further performs operations comprising:
   updating the LFSRs, before the new POW operation, based on a pseudorandom binary sequence (PRBS).

* * * * *